(12) United States Patent
Visbal

(10) Patent No.: US 10,230,746 B2
(45) Date of Patent: *Mar. 12, 2019

(54) SYSTEM AND METHOD FOR EVALUATING NETWORK THREATS AND USAGE

(71) Applicant: Palantir Technologies Inc., Palo Alto, CA (US)

(72) Inventor: Alexander Visbal, New York, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/419,718

(22) Filed: Jan. 30, 2017

(65) Prior Publication Data
US 2017/0237755 A1   Aug. 17, 2017

Related U.S. Application Data

(63) Continuation of application No. 14/816,748, filed on Aug. 3, 2015, now Pat. No. 9,560,066, which is a (Continued)

(51) Int. Cl.
*G06F 21/00* (2013.01)
*H04L 29/06* (2006.01)

(52) U.S. Cl.
CPC ...... *H04L 63/1416* (2013.01); *H04L 63/0209* (2013.01); *H04L 63/0272* (2013.01); *H04L 63/101* (2013.01); *H04L 63/14* (2013.01); *H04L 63/1408* (2013.01); *H04L 63/1425* (2013.01); *H04L 63/1433* (2013.01);
(Continued)

(58) Field of Classification Search
CPC ............ H04L 63/0236; H04L 63/1441; H04L 63/1416; H04L 63/145; H04L 63/14; H04L 63/1433; H04L 63/123; H04L 63/1425; H04L 63/101; H04L 63/1408; H04L 63/0209; H04L 63/0272; G06F 21/56; G06F 21/577
See application file for complete search history.

(56) References Cited

U.S. PATENT DOCUMENTS 5,109,399 A   4/1992  Thompson
5,329,108 A   7/1994  Lamoure
(Continued)

FOREIGN PATENT DOCUMENTS

CN   101729531   6/2010
CN   103281301   9/2013
(Continued)

OTHER PUBLICATIONS

US 8,712,906, 04/2014, Sprague et al. (withdrawn)
(Continued)

*Primary Examiner* — Kendall Dolly
(74) *Attorney, Agent, or Firm* — Knobbe Martens Olson & Bear LLP

(57) ABSTRACT

Systems and methods are presented for generating a threat score and a usage score of each of a plurality of IP addresses. The threat score may be determined based on quantity of occurrences and recency of each occurrence of an IP address in network alert datasets, in addition to a weighting factor for each data source indicating the accuracy of the data source.

19 Claims, 9 Drawing Sheets

Related U.S. Application Data continuation of application No. 14/479,863, filed on Sep. 8, 2014, now Pat. No. 9,100,428, which is a continuation of application No. 14/147,402, filed on Jan. 3, 2014, now Pat. No. 8,832,832.

(52) U.S. Cl.
CPC ...... *H04L 63/1441* (2013.01); *H04L 63/0236* (2013.01); *H04L 63/145* (2013.01)

(56) References Cited

U.S. PATENT DOCUMENTS

| | | |
|---|---|---|
| 5,632,009 A | 5/1997 | Rao et al. |
| 5,670,987 A | 9/1997 | Doi et al. |
| 5,781,704 A | 7/1998 | Rossmo |
| 5,798,769 A | 8/1998 | Chiu et al. |
| 5,845,300 A | 12/1998 | Comer |
| 5,978,475 A | 11/1999 | Schneier et al. |
| 6,057,757 A | 5/2000 | Arrowsmith et al. |
| 6,091,956 A | 7/2000 | Hollenberg |
| 6,161,098 A | 12/2000 | Wallman |
| 6,219,053 B1 | 4/2001 | Tachibana et al. |
| 6,232,971 B1 | 5/2001 | Haynes |
| 6,247,019 B1 | 6/2001 | Davies |
| 6,253,203 B1 | 6/2001 | O'Flaherty et al. |
| 6,279,018 B1 | 8/2001 | Kudrolli et al. |
| 6,341,310 B1 | 1/2002 | Leshem et al. |
| 6,366,933 B1 | 4/2002 | Ball et al. |
| 6,369,835 B1 | 4/2002 | Lin |
| 6,374,251 B1 | 4/2002 | Fayyad et al. |
| 6,456,997 B1 | 9/2002 | Shukla |
| 6,549,944 B1 | 4/2003 | Weinberg et al. |
| 6,560,620 B1 | 5/2003 | Ching |
| 6,567,936 B1 | 5/2003 | Yang et al. |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,642,945 B1 | 11/2003 | Sharpe |
| 6,674,434 B1 | 1/2004 | Chojnacki et al. |
| 6,714,936 B1 | 3/2004 | Nevin, III |
| 6,725,240 B1 | 4/2004 | Asad et al. |
| 6,775,675 B1 | 8/2004 | Nwabueze et al. |
| 6,807,569 B1 | 10/2004 | Bhimani et al. |
| 6,820,135 B1 | 11/2004 | Dingman |
| 6,828,920 B2 | 12/2004 | Owen et al. |
| 6,839,745 B1 | 1/2005 | Dingari et al. |
| 6,877,137 B1 | 4/2005 | Rivette et al. |
| 6,976,210 B1 | 12/2005 | Silva et al. |
| 6,978,419 B1 | 12/2005 | Kantrowitz |
| 6,980,984 B1 | 12/2005 | Huffman et al. |
| 6,985,950 B1 | 1/2006 | Hanson et al. |
| 7,017,046 B2 | 3/2006 | Doyle et al. |
| 7,036,085 B2 | 4/2006 | Barros |
| 7,043,702 B2 | 5/2006 | Chi et al. |
| 7,055,110 B2 | 5/2006 | Kupka et al. |
| 7,069,586 B1 | 6/2006 | Winneg et al. |
| 7,139,800 B2 | 11/2006 | Bellotti et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witowski et al. |
| 7,225,468 B2 | 5/2007 | Waisman et al. |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,373,669 B2 | 5/2008 | Eisen |
| 7,379,811 B2 | 5/2008 | Rasmussen et al. |
| 7,379,903 B2 | 5/2008 | Caballero et al. |
| 7,426,654 B2 | 9/2008 | Adams et al. |
| 7,451,397 B2 | 11/2008 | Weber et al. |
| 7,454,466 B2 | 11/2008 | Bellotti et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,529,734 B2 | 5/2009 | Dirisala |
| 7,546,245 B2 | 6/2009 | Surpin et al. |
| 7,558,677 B2 | 7/2009 | Jones |
| 7,574,409 B2 | 8/2009 | Patinkin |
| 7,574,428 B2 | 8/2009 | Leiserowitz et al. |
| 7,579,965 B2 | 8/2009 | Bucholz |
| 7,593,995 B1 | 9/2009 | He et al. |
| 7,596,285 B2 | 9/2009 | Brown et al. |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,640,173 B2 | 12/2009 | Surpin et al. |
| 7,703,021 B1 | 4/2010 | Flam |
| 7,706,817 B2 | 4/2010 | Bamrah et al. |
| 7,712,049 B2 | 5/2010 | Williams et al. |
| 7,716,067 B2 | 5/2010 | Surpin et al. |
| 7,716,077 B1 | 5/2010 | Mikurak |
| 7,725,530 B2 | 5/2010 | Sah et al. |
| 7,725,547 B2 | 5/2010 | Albertson et al. |
| 7,730,082 B2 | 6/2010 | Sah et al. |
| 7,730,109 B2 | 6/2010 | Rohrs et al. |
| 7,752,665 B1 | 7/2010 | Robertson et al. |
| 7,770,032 B2 | 8/2010 | Nesta et al. |
| 7,770,100 B2 | 8/2010 | Chamberlain et al. |
| 7,783,658 B1 | 8/2010 | Bayliss |
| 7,801,871 B2 | 9/2010 | Gosnell |
| 7,805,457 B1 | 9/2010 | Viola et al. |
| 7,809,703 B2 | 10/2010 | Balabhadrapatruni et al. |
| 7,814,102 B2 | 10/2010 | Miller et al. |
| 7,818,658 B2 | 10/2010 | Chen |
| 7,870,493 B2 | 1/2011 | Pall et al. |
| 7,894,984 B2 | 2/2011 | Rasmussen et al. |
| 7,899,611 B2 | 3/2011 | Downs et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,941,321 B2 | 5/2011 | Greenstein et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,970,240 B1 | 6/2011 | Chao et al. |
| 7,971,150 B2 | 6/2011 | Raskutti et al. |
| 7,984,374 B2 | 6/2011 | Caro et al. |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,010,886 B2 | 8/2011 | Gusmorino et al. |
| 8,015,487 B2 | 9/2011 | Roy et al. |
| 8,019,709 B2 | 9/2011 | Norton et al. |
| 8,024,778 B2 | 9/2011 | Cash et al. |
| 8,036,632 B1 | 10/2011 | Cona et al. |
| 8,036,971 B2 | 10/2011 | Aymeloglu et al. |
| 8,046,283 B2 | 10/2011 | Burns |
| 8,046,362 B2 | 10/2011 | Bayliss |
| 8,054,756 B2 | 11/2011 | Chand et al. |
| 8,082,172 B2 | 12/2011 | Chao et al. |
| 8,103,543 B1 | 1/2012 | Zwicky |
| 8,134,457 B2 | 3/2012 | Velipasalar et al. |
| 8,135,679 B2 | 3/2012 | Bayliss |
| 8,135,719 B2 | 3/2012 | Bayliss |
| 8,145,703 B2 | 3/2012 | Frishert et al. |
| 8,181,253 B1 | 5/2012 | Zaitsev et al. |
| 8,185,819 B2 | 5/2012 | Sah et al. |
| 8,190,893 B2 | 5/2012 | Benson et al. |
| 8,196,184 B2 | 6/2012 | Amirov et al. |
| 8,214,361 B1 | 7/2012 | Sandler et al. |
| 8,214,490 B1 | 7/2012 | Vos et al. |
| 8,214,764 B2 | 7/2012 | Gemmell et al. |
| 8,225,201 B2 | 7/2012 | Michael |
| 8,229,902 B2 | 7/2012 | Vishniac et al. |
| 8,229,947 B2 | 7/2012 | Fujinaga |
| 8,230,333 B2 | 7/2012 | Decherd et al. |
| 8,239,668 B1 | 8/2012 | Chen et al. |
| 8,266,168 B2 | 9/2012 | Bayliss |

(56) References Cited

U.S. PATENT DOCUMENTS

| | | |
|---|---|---|
| 8,271,461 B2 | 9/2012 | Pike et al. |
| 8,271,598 B2 | 9/2012 | Guy et al. |
| 8,280,880 B1 | 10/2012 | Aymeloglu et al. |
| 8,290,926 B2 | 10/2012 | Ozzie et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,302,855 B2 | 11/2012 | Ma et al. |
| 8,312,367 B2 | 11/2012 | Foster |
| 8,312,546 B2 | 11/2012 | Alme |
| 8,321,943 B1 | 11/2012 | Walters et al. |
| 8,347,398 B1 | 1/2013 | Weber |
| 8,352,881 B2 | 1/2013 | Champion et al. |
| 8,368,695 B2 | 2/2013 | Howell et al. |
| 8,397,171 B2 | 3/2013 | Klassen et al. |
| 8,411,046 B2 | 4/2013 | Kruzeniski et al. |
| 8,412,707 B1 | 4/2013 | Mianji |
| 8,447,674 B2 | 5/2013 | Choudhuri et al. |
| 8,447,722 B1 | 5/2013 | Ahuja et al. |
| 8,452,790 B1 | 5/2013 | Mianji |
| 8,463,036 B1 | 6/2013 | Ramesh et al. |
| 8,473,454 B2 | 6/2013 | Evanitsky et al. |
| 8,484,115 B2 | 7/2013 | Aymeloglu et al. |
| 8,484,168 B2 | 7/2013 | Bayliss |
| 8,489,331 B2 | 7/2013 | Kopf et al. |
| 8,489,641 B1 | 7/2013 | Seefeld et al. |
| 8,495,077 B2 | 7/2013 | Bayliss |
| 8,498,969 B2 | 7/2013 | Bayliss |
| 8,498,984 B1 | 7/2013 | Hwang et al. |
| 8,510,743 B2 | 8/2013 | Hackborn et al. |
| 8,514,082 B2 | 8/2013 | Cova et al. |
| 8,515,207 B2 | 8/2013 | Chau |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,560,413 B1 | 10/2013 | Quarterman |
| 8,577,911 B1 | 11/2013 | Stepinski et al. |
| 8,589,273 B2 | 11/2013 | Creeden et al. |
| 8,595,234 B2 | 11/2013 | Siripuapu et al. |
| 8,600,872 B1 | 12/2013 | Yan |
| 8,620,641 B2 | 12/2013 | Farnsworth et al. |
| 8,639,757 B1 | 1/2014 | Zang et al. |
| 8,646,080 B2 | 2/2014 | Williamson et al. |
| 8,676,597 B2 | 3/2014 | Buehler et al. |
| 8,676,857 B1 | 3/2014 | Adams et al. |
| 8,682,812 B1 | 3/2014 | Ranjan |
| 8,683,322 B1 | 3/2014 | Cooper |
| 8,689,108 B1 | 4/2014 | Duffield et al. |
| 8,700,547 B2 | 4/2014 | Long et al. |
| 8,707,185 B2 | 4/2014 | Robinson et al. |
| 8,713,018 B2 | 4/2014 | Knight et al. |
| 8,713,467 B1 | 4/2014 | Goldenberg et al. |
| 8,726,379 B1 | 5/2014 | Stiansen et al. |
| 8,739,278 B2 | 5/2014 | Varghese |
| 8,742,934 B1 | 6/2014 | Sarpy et al. |
| 8,744,890 B1 | 6/2014 | Bernier |
| 8,745,516 B2 | 6/2014 | Mason et al. |
| 8,756,244 B2 | 6/2014 | Dassa et al. |
| 8,769,412 B2 | 7/2014 | Gill et al. |
| 8,781,169 B2 | 7/2014 | Jackson et al. |
| 8,782,794 B2 | 7/2014 | Ramcharran |
| 8,787,939 B2 | 7/2014 | Papakipos et al. |
| 8,788,405 B1 | 7/2014 | Sprague et al. |
| 8,788,407 B1 | 7/2014 | Singh et al. |
| 8,799,190 B2 | 8/2014 | Stokes et al. |
| 8,799,799 B1 | 8/2014 | Cervelli et al. |
| 8,799,812 B2 | 8/2014 | Parker |
| 8,812,960 B1 | 8/2014 | Sun et al. |
| 8,813,050 B2 | 8/2014 | Watters et al. |
| 8,818,892 B1 | 8/2014 | Sprague et al. |
| 8,830,322 B2 | 9/2014 | Nerayoff et al. |
| 8,832,594 B1 | 9/2014 | Thompson et al. |
| 8,832,832 B1 | 9/2014 | Visbal |
| 8,839,434 B2 | 9/2014 | McDougal et al. |
| 8,868,486 B2 | 10/2014 | Tamayo |
| 8,868,537 B1 | 10/2014 | Colgrove et al. |
| 8,917,274 B2 | 12/2014 | Ma et al. |
| 8,924,388 B2 | 12/2014 | Elliot et al. |
| 8,924,389 B2 | 12/2014 | Elliot et al. |
| 8,924,872 B1 | 12/2014 | Bogomolov et al. |
| 8,937,619 B2 | 1/2015 | Sharma et al. |
| 8,938,686 B1 | 1/2015 | Erenrich et al. |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,043,696 B1 | 5/2015 | Meiklejohn et al. |
| 9,043,894 B1 | 5/2015 | Dennison et al. |
| 9,047,441 B2 | 6/2015 | Xie et al. |
| 9,049,117 B1 | 6/2015 | Nucci et al. |
| 9,100,428 B1 | 8/2015 | Visbal |
| 9,116,975 B2 | 8/2015 | Shankar et al. |
| 9,135,658 B2 | 9/2015 | Sprague et al. |
| 9,165,299 B1 | 10/2015 | Stowe et al. |
| 9,171,334 B1 | 10/2015 | Visbal et al. |
| 9,177,014 B2 | 11/2015 | Gross |
| 9,177,344 B1 | 11/2015 | Singh et al. |
| 9,202,249 B1 | 12/2015 | Cohen et al. |
| 9,215,240 B2 * | 12/2015 | Merza ............... H04L 63/1408 |
| 9,230,280 B1 | 1/2016 | Maag et al. |
| 9,235,638 B2 | 1/2016 | Gattiker et al. |
| 9,256,664 B2 | 2/2016 | Chakerian et al. |
| 9,335,897 B2 | 5/2016 | Goldenberg |
| 9,338,013 B2 | 5/2016 | Castellucci et al. |
| 9,344,447 B2 | 5/2016 | Cohen et al. |
| 9,367,872 B1 | 6/2016 | Visbal et al. |
| 9,558,352 B1 | 1/2017 | Dennison et al. |
| 9,560,066 B2 | 1/2017 | Visbal |
| 9,635,046 B2 | 4/2017 | Spiro et al. |
| 2001/0021936 A1 | 9/2001 | Bertram |
| 2002/0033848 A1 | 3/2002 | Sciammarella et al. |
| 2002/0065708 A1 | 5/2002 | Senay et al. |
| 2002/0091707 A1 | 7/2002 | Keller |
| 2002/0095360 A1 | 7/2002 | Joao |
| 2002/0095658 A1 | 7/2002 | Shulman |
| 2002/0103705 A1 | 8/2002 | Brady |
| 2002/0112157 A1 | 8/2002 | Doyle et al. |
| 2002/0116120 A1 | 8/2002 | Ruiz et al. |
| 2002/0130907 A1 | 9/2002 | Chi et al. |
| 2002/0147805 A1 | 10/2002 | Leshem et al. |
| 2002/0174201 A1 | 11/2002 | Ramer et al. |
| 2002/0194119 A1 | 12/2002 | Wright et al. |
| 2003/0028560 A1 | 2/2003 | Kudrolli et al. |
| 2003/0033228 A1 | 2/2003 | Bosworth-Davies et al. |
| 2003/0039948 A1 | 2/2003 | Donahue |
| 2003/0074368 A1 | 4/2003 | Schuetze et al. |
| 2003/0097330 A1 | 5/2003 | Hillmer et al. |
| 2003/0140106 A1 | 7/2003 | Raguseo |
| 2003/0144868 A1 | 7/2003 | MacIntyre et al. |
| 2003/0154044 A1 | 8/2003 | Lundstedt et al. |
| 2003/0163352 A1 | 8/2003 | Surpin et al. |
| 2003/0200217 A1 | 10/2003 | Ackerman |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0034570 A1 | 2/2004 | Davis |
| 2004/0044912 A1 * | 3/2004 | Connary ............... H04L 43/045 726/23 |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0111410 A1 | 6/2004 | Burgoon et al. |
| 2004/0123139 A1 | 6/2004 | Aiello et al. |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0153418 A1 | 8/2004 | Hanweck |
| 2004/0163039 A1 | 8/2004 | McPherson et al. |
| 2004/0181554 A1 | 9/2004 | Heckerman et al. |
| 2004/0193600 A1 | 9/2004 | Kaasten et al. |
| 2004/0205524 A1 | 10/2004 | Richter et al. |
| 2004/0221223 A1 | 11/2004 | Yu et al. |
| 2004/0250124 A1 | 12/2004 | Chesla et al. |
| 2004/0260702 A1 | 12/2004 | Cragun et al. |

(56) References Cited

U.S. PATENT DOCUMENTS

| | | |
|---|---|---|
| 2004/0267746 A1 | 12/2004 | Marcjan et al. |
| 2005/0010472 A1 | 1/2005 | Ouatse et al. |
| 2005/0027705 A1 | 2/2005 | Sadri et al. |
| 2005/0028094 A1 | 2/2005 | Allyn |
| 2005/0039119 A1 | 2/2005 | Parks et al. |
| 2005/0065811 A1 | 3/2005 | Chu et al. |
| 2005/0080769 A1 | 4/2005 | Gemmell |
| 2005/0086207 A1 | 4/2005 | Heuer et al. |
| 2005/0108063 A1 | 5/2005 | Madill et al. |
| 2005/0125715 A1 | 6/2005 | Franco et al. |
| 2005/0157662 A1 | 7/2005 | Bingham et al. |
| 2005/0162523 A1 | 7/2005 | Darrell et al. |
| 2005/0166144 A1 | 7/2005 | Gross |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0204001 A1 | 9/2005 | Stein et al. |
| 2005/0210409 A1 | 9/2005 | Jou |
| 2005/0222928 A1 | 10/2005 | Steier et al. |
| 2005/0229256 A2 | 10/2005 | Banzhof |
| 2005/0246327 A1 | 11/2005 | Yeung et al. |
| 2005/0251786 A1 | 11/2005 | Citron et al. |
| 2005/0262556 A1 | 11/2005 | Waisman et al. |
| 2005/0275638 A1 | 12/2005 | Kolmykov-Zotov et al. |
| 2006/0026120 A1 | 2/2006 | Carolan et al. |
| 2006/0026170 A1 | 2/2006 | Kreitler et al. |
| 2006/0026688 A1* | 2/2006 | Shah .................. G06F 21/577 726/25 |
| 2006/0031928 A1 | 2/2006 | Conley et al. |
| 2006/0045470 A1 | 3/2006 | Poslinski et al. |
| 2006/0059139 A1 | 3/2006 | Robinson |
| 2006/0059238 A1* | 3/2006 | Slater .................. G06Q 10/107 709/206 |
| 2006/0069912 A1 | 3/2006 | Zheng et al. |
| 2006/0074866 A1 | 4/2006 | Chamberlain et al. |
| 2006/0074881 A1 | 4/2006 | Vembu et al. |
| 2006/0080619 A1 | 4/2006 | Carlson et al. |
| 2006/0093222 A1 | 5/2006 | Saffer et al. |
| 2006/0095521 A1 | 5/2006 | Patinkin |
| 2006/0129746 A1 | 6/2006 | Porter |
| 2006/0139375 A1 | 6/2006 | Rasmussen et al. |
| 2006/0142949 A1 | 6/2006 | Helt |
| 2006/0143034 A1 | 6/2006 | Rothermel |
| 2006/0143075 A1 | 6/2006 | Carr et al. |
| 2006/0143079 A1 | 6/2006 | Basak et al. |
| 2006/0149596 A1 | 7/2006 | Surpin et al. |
| 2006/0179003 A1 | 8/2006 | Steele et al. |
| 2006/0203337 A1 | 9/2006 | White |
| 2006/0212931 A1* | 9/2006 | Shull .................. G06F 21/55 726/10 |
| 2006/0218637 A1 | 9/2006 | Thomas et al. |
| 2006/0241974 A1 | 10/2006 | Chao et al. |
| 2006/0242040 A1 | 10/2006 | Rader |
| 2006/0242630 A1 | 10/2006 | Koike et al. |
| 2006/0265747 A1 | 11/2006 | Judge |
| 2006/0271277 A1 | 11/2006 | Hu et al. |
| 2006/0279630 A1 | 12/2006 | Aggarwal et al. |
| 2007/0000999 A1 | 1/2007 | Kubo et al. |
| 2007/0011150 A1 | 1/2007 | Frank |
| 2007/0011304 A1 | 1/2007 | Error |
| 2007/0016363 A1 | 1/2007 | Huang et al. |
| 2007/0038646 A1 | 2/2007 | Thota |
| 2007/0038962 A1 | 2/2007 | Fuchs et al. |
| 2007/0057966 A1 | 3/2007 | Ohno et al. |
| 2007/0078832 A1 | 4/2007 | Ott et al. |
| 2007/0083541 A1 | 4/2007 | Fraleigh et al. |
| 2007/0094389 A1 | 4/2007 | Nussey et al. |
| 2007/0094500 A1 | 4/2007 | Shannon et al. |
| 2007/0106582 A1 | 5/2007 | Baker et al. |
| 2007/0143851 A1 | 6/2007 | Nicodemus |
| 2007/0150369 A1 | 6/2007 | Zivin |
| 2007/0174760 A1 | 7/2007 | Chamberlain et al. |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0233709 A1 | 10/2007 | Abnous |
| 2007/0240062 A1 | 10/2007 | Christena et al. |
| 2007/0266336 A1 | 11/2007 | Nojima et al. |
| 2007/0284433 A1 | 12/2007 | Domenica et al. |
| 2007/0294200 A1 | 12/2007 | Au |
| 2007/0294643 A1 | 12/2007 | Kyle |
| 2007/0294766 A1 | 12/2007 | Mir et al. |
| 2008/0016216 A1 | 1/2008 | Worley et al. |
| 2008/0040684 A1 | 2/2008 | Crump |
| 2008/0051989 A1 | 2/2008 | Welsh |
| 2008/0052142 A1 | 2/2008 | Bailey et al. |
| 2008/0069081 A1 | 3/2008 | Chand et al. |
| 2008/0077597 A1 | 3/2008 | Butler |
| 2008/0077642 A1 | 3/2008 | Carbone et al. |
| 2008/0082486 A1 | 4/2008 | Lermant et al. |
| 2008/0104019 A1 | 5/2008 | Nath |
| 2008/0104407 A1 | 5/2008 | Horne et al. |
| 2008/0126951 A1 | 5/2008 | Sood et al. |
| 2008/0133567 A1 | 6/2008 | Ames et al. |
| 2008/0148398 A1 | 6/2008 | Mezack et al. |
| 2008/0155440 A1 | 6/2008 | Trevor et al. |
| 2008/0162616 A1 | 7/2008 | Gross et al. |
| 2008/0175266 A1 | 7/2008 | Alperovitch et al. |
| 2008/0195417 A1 | 8/2008 | Surpin et al. |
| 2008/0195608 A1 | 8/2008 | Clover |
| 2008/0201580 A1 | 8/2008 | Savitzky et al. |
| 2008/0222295 A1 | 9/2008 | Robinson et al. |
| 2008/0222706 A1 | 9/2008 | Renaud et al. |
| 2008/0229422 A1 | 9/2008 | Hudis et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0288425 A1 | 11/2008 | Posse et al. |
| 2008/0301643 A1 | 12/2008 | Appleton et al. |
| 2008/0313132 A1 | 12/2008 | Hao et al. |
| 2009/0002492 A1 | 1/2009 | Velipasalar et al. |
| 2009/0018940 A1 | 1/2009 | Wang et al. |
| 2009/0024505 A1 | 1/2009 | Patel et al. |
| 2009/0027418 A1 | 1/2009 | Maru et al. |
| 2009/0030915 A1 | 1/2009 | Winter et al. |
| 2009/0044279 A1 | 2/2009 | Crawford et al. |
| 2009/0055251 A1 | 2/2009 | Shah et al. |
| 2009/0076845 A1 | 3/2009 | Bellin et al. |
| 2009/0082997 A1 | 3/2009 | Tokman et al. |
| 2009/0083184 A1 | 3/2009 | Eisen |
| 2009/0088964 A1 | 4/2009 | Schaaf et al. |
| 2009/0094166 A1 | 4/2009 | Aymeloglu et al. |
| 2009/0103442 A1 | 4/2009 | Douville |
| 2009/0106178 A1 | 4/2009 | Chu |
| 2009/0112745 A1 | 4/2009 | Stefanescu |
| 2009/0119309 A1 | 5/2009 | Gibson et al. |
| 2009/0125359 A1 | 5/2009 | Knapic |
| 2009/0125369 A1 | 5/2009 | Kloosstra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172821 A1 | 7/2009 | Daira et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0187546 A1 | 7/2009 | Whyte et al. |
| 2009/0187548 A1 | 7/2009 | Ji et al. |
| 2009/0192957 A1 | 7/2009 | Subramanian et al. |
| 2009/0222400 A1 | 9/2009 | Kupershmidt et al. |
| 2009/0222759 A1 | 9/2009 | Drieschner |
| 2009/0222760 A1 | 9/2009 | Halverson et al. |
| 2009/0228701 A1 | 9/2009 | Lin |
| 2009/0234720 A1 | 9/2009 | George et al. |

(56) References Cited

U.S. PATENT DOCUMENTS

| | | |
|---|---|---|
| 2009/0249244 A1 | 10/2009 | Robinson et al. |
| 2009/0254970 A1 | 10/2009 | Agarwal et al. |
| 2009/0254971 A1 | 10/2009 | Herz |
| 2009/0271343 A1 | 10/2009 | Vaiciulis et al. |
| 2009/0271359 A1 | 10/2009 | Bayliss |
| 2009/0281839 A1 | 11/2009 | Lynn et al. |
| 2009/0287470 A1 | 11/2009 | Farnsworth et al. |
| 2009/0292626 A1 | 11/2009 | Oxford |
| 2009/0300589 A1 | 12/2009 | Watters et al. |
| 2009/0313463 A1 | 12/2009 | Pang et al. |
| 2009/0318775 A1 | 12/2009 | Michelson et al. |
| 2009/0319418 A1 | 12/2009 | Herz |
| 2009/0328222 A1 | 12/2009 | Heiman et al. |
| 2010/0011282 A1 | 1/2010 | Dollard et al. |
| 2010/0042922 A1 | 2/2010 | Bradateanu et al. |
| 2010/0057622 A1 | 3/2010 | Faith et al. |
| 2010/0057716 A1 | 3/2010 | Stefik et al. |
| 2010/0070523 A1 | 3/2010 | Delgo et al. |
| 2010/0070842 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0077481 A1 | 3/2010 | Polyakov et al. |
| 2010/0077483 A1 | 3/2010 | Stolfo et al. |
| 2010/0098318 A1 | 4/2010 | Anderson |
| 2010/0100963 A1 | 4/2010 | Mahaffey |
| 2010/0103124 A1 | 4/2010 | Kruzeniski et al. |
| 2010/0106611 A1 | 4/2010 | Paulsen et al. |
| 2010/0114887 A1 | 5/2010 | Conway et al. |
| 2010/0122152 A1 | 5/2010 | Chamberlain et al. |
| 2010/0125546 A1 | 5/2010 | Barrett et al. |
| 2010/0131457 A1 | 5/2010 | Heimendinger |
| 2010/0162176 A1 | 6/2010 | Dunton |
| 2010/0169237 A1 | 7/2010 | Howard et al. |
| 2010/0185691 A1 | 7/2010 | Irmak et al. |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0211578 A1 | 8/2010 | Lundberg et al. |
| 2010/0228812 A1 | 9/2010 | Uomini |
| 2010/0235915 A1 | 9/2010 | Memon et al. |
| 2010/0250412 A1 | 9/2010 | Wagner |
| 2010/0262688 A1 | 10/2010 | Hussain et al. |
| 2010/0280857 A1 | 11/2010 | Liu et al. |
| 2010/0293174 A1 | 11/2010 | Bennett et al. |
| 2010/0306029 A1 | 12/2010 | Jolley |
| 2010/0306713 A1 | 12/2010 | Geisner et al. |
| 2010/0313119 A1 | 12/2010 | Baldwin et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0029526 A1 | 2/2011 | Knight et al. |
| 2011/0047159 A1 | 2/2011 | Baid et al. |
| 2011/0055140 A1 | 3/2011 | Roychowdhury |
| 2011/0060753 A1 | 3/2011 | Shaked et al. |
| 2011/0060910 A1 | 3/2011 | Gormish et al. |
| 2011/0061013 A1 | 3/2011 | Bilicki et al. |
| 2011/0066933 A1 | 3/2011 | Ludwig |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0087519 A1 | 4/2011 | Fordyce, III et al. |
| 2011/0093327 A1 | 4/2011 | Fordyce, III et al. |
| 2011/0099133 A1 | 4/2011 | Chang et al. |
| 2011/0117878 A1 | 5/2011 | Barash et al. |
| 2011/0119100 A1 | 5/2011 | Ruhl et al. |
| 2011/0131122 A1 | 6/2011 | Griffin et al. |
| 2011/0137766 A1 | 6/2011 | Rasmussen et al. |
| 2011/0153384 A1 | 6/2011 | Horne et al. |
| 2011/0161096 A1 | 6/2011 | Buehler et al. |
| 2011/0167054 A1 | 7/2011 | Bailey et al. |
| 2011/0167105 A1 | 7/2011 | Ramakrishnan et al. |
| 2011/0167493 A1 | 7/2011 | Song et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0178842 A1 | 7/2011 | Rane et al. |
| 2011/0185316 A1 | 7/2011 | Reid et al. |
| 2011/0202555 A1 | 8/2011 | Cordover et al. |
| 2011/0208724 A1 | 8/2011 | Jones et al. |
| 2011/0213655 A1 | 9/2011 | Henkin |
| 2011/0218934 A1 | 9/2011 | Elser |
| 2011/0219450 A1 | 9/2011 | McDougal et al. |
| 2011/0225198 A1 | 9/2011 | Edwards et al. |
| 2011/0225650 A1 | 9/2011 | Margolies et al. |
| 2011/0231223 A1 | 9/2011 | Winters |
| 2011/0238495 A1 | 9/2011 | Kang |
| 2011/0238510 A1 | 9/2011 | Rowen et al. |
| 2011/0238553 A1 | 9/2011 | Raj et al. |
| 2011/0238570 A1 | 9/2011 | Li et al. |
| 2011/0246229 A1 | 10/2011 | Pacha |
| 2011/0251951 A1 | 10/2011 | Kolkowtiz |
| 2011/0258158 A1 | 10/2011 | Resende et al. |
| 2011/0270604 A1 | 11/2011 | Qi et al. |
| 2011/0270705 A1 | 11/2011 | Parker |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0307382 A1 | 12/2011 | Siegel et al. |
| 2011/0310005 A1 | 12/2011 | Chen et al. |
| 2011/0314007 A1 | 12/2011 | Dassa et al. |
| 2011/0314546 A1 | 12/2011 | Aziz et al. |
| 2012/0004904 A1 | 1/2012 | Shin et al. |
| 2012/0011238 A1 | 1/2012 | Rathod |
| 2012/0019559 A1 | 1/2012 | Siler et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0066166 A1 | 3/2012 | Curbera et al. |
| 2012/0066296 A1 | 3/2012 | Appleton et al. |
| 2012/0072825 A1 | 3/2012 | Sherkin et al. |
| 2012/0079363 A1 | 3/2012 | Folting et al. |
| 2012/0079592 A1* | 3/2012 | Pandrangi ............ H04L 47/10 726/22 |
| 2012/0084118 A1 | 4/2012 | Bai et al. |
| 2012/0084135 A1 | 4/2012 | Nissan et al. |
| 2012/0084866 A1 | 4/2012 | Stolfo |
| 2012/0106801 A1 | 5/2012 | Jackson |
| 2012/0110633 A1 | 5/2012 | An et al. |
| 2012/0110674 A1 | 5/2012 | Belani et al. |
| 2012/0117082 A1 | 5/2012 | Koperda et al. |
| 2012/0131107 A1 | 5/2012 | Yost |
| 2012/0131512 A1 | 5/2012 | Takeuchi et al. |
| 2012/0137235 A1 | 5/2012 | Ts et al. |
| 2012/0144335 A1 | 6/2012 | Abeln et al. |
| 2012/0158626 A1 | 6/2012 | Zhu et al. |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0169593 A1 | 7/2012 | Mak et al. |
| 2012/0170847 A1 | 7/2012 | Tsukidate |
| 2012/0173381 A1 | 7/2012 | Smith |
| 2012/0173985 A1 | 7/2012 | Peppel |
| 2012/0180002 A1 | 7/2012 | Campbell et al. |
| 2012/0196557 A1 | 8/2012 | Reich et al. |
| 2012/0196558 A1 | 8/2012 | Reich et al. |
| 2012/0197651 A1 | 8/2012 | Robinson et al. |
| 2012/0203708 A1 | 8/2012 | Psota et al. |
| 2012/0208636 A1 | 8/2012 | Feige |
| 2012/0215898 A1 | 8/2012 | Shah et al. |
| 2012/0218305 A1 | 8/2012 | Patterson et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0254947 A1* | 10/2012 | Dheap ............ H04L 63/20 726/4 |
| 2012/0266245 A1 | 10/2012 | McDougal et al. |
| 2012/0284345 A1 | 11/2012 | Costenaro et al. |
| 2012/0284791 A1 | 11/2012 | Miller et al. |

(56) References Cited

U.S. PATENT DOCUMENTS

| | | |
|---|---|---|
| 2012/0290879 A1 | 11/2012 | Shibuya et al. |
| 2012/0296907 A1 | 11/2012 | Long et al. |
| 2012/0304244 A1 | 11/2012 | Xie et al. |
| 2012/0310831 A1 | 12/2012 | Harris et al. |
| 2012/0310838 A1 | 12/2012 | Harris et al. |
| 2012/0311684 A1 | 12/2012 | Paulsen et al. |
| 2012/0323829 A1 | 12/2012 | Stokes et al. |
| 2012/0323888 A1 | 12/2012 | Osann, Jr. |
| 2012/0330801 A1 | 12/2012 | McDougal et al. |
| 2012/0330973 A1 | 12/2012 | Ghuneim et al. |
| 2013/0006426 A1 | 1/2013 | Healey et al. |
| 2013/0006655 A1 | 1/2013 | Van Arkel et al. |
| 2013/0006668 A1 | 1/2013 | Van Arkel et al. |
| 2013/0006725 A1 | 1/2013 | Simanek et al. |
| 2013/0006916 A1 | 1/2013 | McBride et al. |
| 2013/0018796 A1 | 1/2013 | Kolhatkar et al. |
| 2013/0019306 A1 | 1/2013 | Lagar-Cavilla et al. |
| 2013/0024268 A1 | 1/2013 | Manickavelu |
| 2013/0024307 A1 | 1/2013 | Fuerstenberg et al. |
| 2013/0024339 A1 | 1/2013 | Choudhuri et al. |
| 2013/0046635 A1 | 2/2013 | Grigg et al. |
| 2013/0046842 A1 | 2/2013 | Muntz et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0086482 A1 | 4/2013 | Parsons |
| 2013/0096988 A1 | 4/2013 | Grossman et al. |
| 2013/0097482 A1 | 4/2013 | Marantz et al. |
| 2013/0097709 A1 | 4/2013 | Basavapatna et al. |
| 2013/0101159 A1 | 4/2013 | Chao et al. |
| 2013/0110822 A1 | 5/2013 | Ikeda et al. |
| 2013/0110876 A1 | 5/2013 | Meijer et al. |
| 2013/0110877 A1 | 5/2013 | Bonham et al. |
| 2013/0111320 A1 | 5/2013 | Campbell et al. |
| 2013/0117651 A1 | 5/2013 | Waldman et al. |
| 2013/0139261 A1 | 5/2013 | Friedrichs et al. |
| 2013/0139268 A1 | 5/2013 | An et al. |
| 2013/0150004 A1 | 6/2013 | Rosen |
| 2013/0151148 A1 | 6/2013 | Parundekar et al. |
| 2013/0151388 A1 | 6/2013 | Falkenborg et al. |
| 2013/0151453 A1 | 6/2013 | Bhanot et al. |
| 2013/0157234 A1 | 6/2013 | Gulli et al. |
| 2013/0160120 A1 | 6/2013 | Malaviya et al. |
| 2013/0166480 A1 | 6/2013 | Popescu et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0185307 A1 | 7/2013 | El-Yaniv et al. |
| 2013/0185320 A1 | 7/2013 | Iwasaki et al. |
| 2013/0197925 A1 | 8/2013 | Blue |
| 2013/0211985 A1 | 8/2013 | Clark et al. |
| 2013/0224696 A1 | 8/2013 | Wolfe et al. |
| 2013/0225212 A1 | 8/2013 | Khan |
| 2013/0226318 A1 | 8/2013 | Procyk |
| 2013/0226953 A1 | 8/2013 | Markovich et al. |
| 2013/0232045 A1 | 9/2013 | Tai et al. |
| 2013/0238616 A1 | 9/2013 | Rose et al. |
| 2013/0239217 A1 | 9/2013 | Kindler et al. |
| 2013/0246170 A1 | 9/2013 | Gross et al. |
| 2013/0251233 A1 | 9/2013 | Yang et al. |
| 2013/0262527 A1 | 10/2013 | Hunter et al. |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0268994 A1* | 10/2013 | Cooper .................. H04L 63/10 726/1 |
| 2013/0276799 A1 | 10/2013 | Davidson |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandrasekaran et al. |
| 2013/0311375 A1 | 11/2013 | Priebatsch |
| 2013/0318594 A1 | 11/2013 | Hoy et al. |
| 2013/0339218 A1 | 12/2013 | Subramanian et al. |
| 2013/0339514 A1 | 12/2013 | Crank et al. |
| 2014/0006109 A1 | 1/2014 | Callioni et al. |
| 2014/0012796 A1 | 1/2014 | Petersen et al. |
| 2014/0013451 A1 | 1/2014 | Kulka et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047319 A1 | 2/2014 | Eberlein |
| 2014/0047357 A1 | 2/2014 | Alfaro et al. |
| 2014/0058763 A1 | 2/2014 | Zizzamia et al. |
| 2014/0059038 A1 | 2/2014 | McPherson et al. |
| 2014/0059683 A1 | 2/2014 | Ashley |
| 2014/0067611 A1 | 3/2014 | Adachi et al. |
| 2014/0068487 A1 | 3/2014 | Steiger et al. |
| 2014/0074855 A1 | 3/2014 | Zhao et al. |
| 2014/0081652 A1 | 3/2014 | Klindworth |
| 2014/0095273 A1 | 4/2014 | Tang et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0129261 A1 | 5/2014 | Bothwell et al. |
| 2014/0136285 A1 | 5/2014 | Carvalho |
| 2014/0143009 A1 | 5/2014 | Brice et al. |
| 2014/0149130 A1 | 5/2014 | Getchius |
| 2014/0149272 A1 | 5/2014 | Hirani et al. |
| 2014/0149436 A1 | 5/2014 | Bahrami et al. |
| 2014/0156484 A1 | 6/2014 | Chan et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0173712 A1 | 6/2014 | Ferdinand |
| 2014/0173738 A1 | 6/2014 | Condry et al. |
| 2014/0188895 A1 | 7/2014 | Wang et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0214579 A1 | 7/2014 | Shen et al. |
| 2014/0222521 A1 | 8/2014 | Chait |
| 2014/0222793 A1 | 8/2014 | Sadkin et al. |
| 2014/0229422 A1 | 8/2014 | Jain et al. |
| 2014/0244388 A1 | 8/2014 | Manouchehri et al. |
| 2014/0267294 A1 | 9/2014 | Ma |
| 2014/0267295 A1 | 9/2014 | Sharma |
| 2014/0279824 A1 | 9/2014 | Tamayo |
| 2014/0283067 A1 | 9/2014 | Call et al. |
| 2014/0283107 A1 | 9/2014 | Walton et al. |
| 2014/0310266 A1 | 10/2014 | Greenfield |
| 2014/0310282 A1 | 10/2014 | Sprague et al. |
| 2014/0316911 A1 | 10/2014 | Gross |
| 2014/0325643 A1 | 10/2014 | Bart et al. |
| 2014/0331119 A1 | 11/2014 | Dixon et al. |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0366132 A1 | 12/2014 | Stiansen et al. |
| 2014/0379812 A1 | 12/2014 | Bastide et al. |
| 2015/0019394 A1 | 1/2015 | Unser et al. |
| 2015/0039565 A1 | 2/2015 | Lucas |
| 2015/0046791 A1 | 2/2015 | Isaacson |
| 2015/0046844 A1 | 2/2015 | Lee et al. |
| 2015/0046845 A1 | 2/2015 | Lee et al. |
| 2015/0046870 A1 | 2/2015 | Goldenberg et al. |
| 2015/0046876 A1 | 2/2015 | Goldenberg |
| 2015/0067533 A1 | 3/2015 | Volach |
| 2015/0089424 A1 | 3/2015 | Duffield et al. |
| 2015/0100897 A1 | 4/2015 | Sun et al. |
| 2015/0100907 A1 | 4/2015 | Erenrich et al. |
| 2015/0106379 A1 | 4/2015 | Elliot et al. |
| 2015/0128274 A1* | 5/2015 | Giokas .................. H04L 63/1425 726/23 |
| 2015/0134666 A1 | 5/2015 | Gattiker et al. |
| 2015/0169709 A1 | 6/2015 | Kara et al. |
| 2015/0169726 A1 | 6/2015 | Kara et al. |
| 2015/0170077 A1 | 6/2015 | Kara et al. |

(56) References Cited

U.S. PATENT DOCUMENTS

| | | | |
|---|---|---|---|
| 2015/0178825 A1 | 6/2015 | Huerta | |
| 2015/0178877 A1 | 6/2015 | Bogomolov et al. | |
| 2015/0186821 A1 | 7/2015 | Wang et al. | |
| 2015/0187036 A1 | 7/2015 | Wang et al. | |
| 2015/0188715 A1 | 7/2015 | Castelluci et al. | |
| 2015/0207809 A1* | 7/2015 | Macaulay | G06F 21/552 726/22 |
| 2015/0223158 A1 | 8/2015 | McCann et al. | |
| 2015/0227295 A1 | 8/2015 | Meiklejohn et al. | |
| 2015/0229664 A1 | 8/2015 | Hawthorn et al. | |
| 2015/0235334 A1 | 8/2015 | Wang et al. | |
| 2015/0248563 A1 | 9/2015 | Alfarano et al. | |
| 2015/0256498 A1 | 9/2015 | Snider et al. | |
| 2015/0261847 A1 | 9/2015 | Ducott et al. | |
| 2015/0309719 A1 | 10/2015 | Ma et al. | |
| 2015/0317342 A1 | 11/2015 | Grossman et al. | |
| 2015/0324868 A1 | 11/2015 | Kaftan et al. | |
| 2015/0326601 A1 | 11/2015 | Grondin et al. | |
| 2015/0347558 A1 | 12/2015 | Blaas et al. | |
| 2016/0004764 A1 | 1/2016 | Chakerian et al. | |
| 2016/0004864 A1 | 1/2016 | Falk et al. | |
| 2016/0028759 A1 | 1/2016 | Visbal | |
| 2016/0034470 A1 | 2/2016 | Sprague et al. | |
| 2016/0048937 A1 | 2/2016 | Mathura et al. | |
| 2017/0041335 A1 | 2/2017 | Spiro et al. | |
| 2017/0134397 A1 | 5/2017 | Dennison et al. | |
| 2017/0187739 A1 | 6/2017 | Spiro et al. | |

FOREIGN PATENT DOCUMENTS

| | | | |
|---|---|---|---|
| CN | 102054015 | 5/2014 | |
| DE | 102014103482 | 9/2014 | |
| DE | 102014204827 | 9/2014 | |
| DE | 102014204830 | 9/2014 | |
| DE | 102014204834 | 9/2014 | |
| DE | 102014215621 | 2/2015 | |
| EP | 1191463 | 3/2002 | |
| EP | 1672527 | 6/2006 | |
| EP | 1962222 | 8/2008 | |
| EP | 2551799 | 1/2013 | |
| EP | 2555153 | 2/2013 | |
| EP | 2560134 | 2/2013 | |
| EP | 2778977 | 9/2014 | |
| EP | 2778983 | 9/2014 | |
| EP | 2779082 | 9/2014 | |
| EP | 2835745 | 2/2015 | |
| EP | 2835770 | 2/2015 | |
| EP | 2838039 | 2/2015 | |
| EP | 2846241 | 3/2015 | |
| EP | 2851852 | 3/2015 | |
| EP | 2858014 | 4/2015 | |
| EP | 2858018 | 4/2015 | |
| EP | 2863326 | 4/2015 | |
| EP | 2863346 | 4/2015 | |
| EP | 2869211 | 5/2015 | |
| EP | 2881868 | 6/2015 | |
| EP | 2884439 | 6/2015 | |
| EP | 2884440 | 6/2015 | |
| EP | 2891992 | 7/2015 | |
| EP | 2892197 | 7/2015 | |
| EP | 2897051 | 7/2015 | |
| EP | 2911078 | 8/2015 | |
| EP | 2911100 | 8/2015 | |
| EP | 2940603 | 11/2015 | |
| EP | 2940609 | 11/2015 | |
| EP | 2963577 | 1/2016 | |
| EP | 2963578 | 1/2016 | |
| EP | 2985729 | 2/2016 | |
| EP | 2985974 | 2/2016 | |
| EP | 3018879 | 5/2016 | |
| GB | 2513247 | 10/2014 | |
| GB | 2516155 | 1/2015 | |
| GB | 2518745 | 4/2015 | |
| NL | 2012778 | 11/2014 | |
| NL | 2013306 | 2/2015 | |
| NL | 2011642 | 8/2015 | |
| NZ | 624557 | 12/2014 | |
| WO | WO 2000/009529 | 2/2000 | |
| WO | WO 2002/065353 | 8/2002 | |
| WO | WO 2005/010685 | 2/2005 | |
| WO | WO 2005/104736 | 11/2005 | |
| WO | WO 2005/116851 | 12/2005 | |
| WO | WO-2005116851 A2 * | 12/2005 | G06Q 10/107 |
| WO | WO 2008/011728 | 1/2008 | |
| WO | WO 2008/064207 | 5/2008 | |
| WO | WO 2008/113059 | 9/2008 | |
| WO | WO 2009/061501 | 5/2009 | |
| WO | WO 2010/000014 | 1/2010 | |
| WO | WO 2010/030913 | 3/2010 | |
| WO | WO 2013/010157 | 1/2013 | |
| WO | WO 2013/102892 | 7/2013 | |
| WO | WO 2013/126281 | 8/2013 | |

OTHER PUBLICATIONS

US 8,725,631, 05/2014, Sprague et al. (withdrawn)
"A First Look: Predicting Market Demand for Food Retail using a Huff Analysis," TRF Policy Solutions, Jul. 2012, pp. 30.
"A Quick Guide to UniProtKB Swiss-Prot & TrEMBL," Sep. 2011, pp. 2.
"A Word About Banks and the Laundering of Drug Money," Aug. 18, 2012, http://www.golemxiv.co.uk/2012/08/a-word-about-banks-and-the-laundering-of-drug-money/.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
"Money Laundering Risks and E-Gaming: A European Overview and Assessment," 2009, http://www.cf.ac.uk/socsi/resources/Levi_Final_Money_Laundering_Risks_egaming.pdf.
"Potential Money Laundering Warning Signs," snapshot taken 2003, https://web.archive.org/web/20030816090055/http:/finsolinc.com/ANTI-MONEY%20LAUNDERING%20TRAINING%20GUIDES.pdf.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
"The FASTA Program Package," fasta-36.3.4, Mar. 25, 2011, pp. 29.
"Using Whois Based Geolocation and Google Maps API for Support Cybercrime Investigations," http://wseas.us/e-library/conferences/2013/Dubrovnik/TELECIRC/TELECIRC-32.pdf.
About 80 Minutes, "Palantir in a Number of Parts—Part 6—Graph," Mar. 21, 2013, pp. 1-6.
Acklen, Laura, "Absolute Beginner's Guide to Microsoft Word 2003," Dec. 24, 2003, pp. 15-18, 34-41, 308-316.
Alfred, Rayner "Summarizing Relational Data Using Semi-Supervised Genetic Algorithm-Based Clustering Techniques", Journal of Computer Science, 2010, vol. 6, No. 7, pp. 775-784.
Alur et al., "Chapter 2: IBM InfoSphere DataStage Stages," IBM InfoSphere DataStage Data Flow and Job Design, Jul. 1, 2008, pp. 35-137.
Amnet, "5 Great Tools for Visualizing Your Twitter Followers," posted Aug. 4, 2010, http://www.amnetblog.com/component/content/article/115-5-grate-tools-for-visualizing-your-twitter-followers.html.
Ananiev et al., "The New Modality API," http://web.archive.org/web/20061211011958/http://java.sun.com/developer/technicalArticles/J2SE/Desktop/javase6/modality/ Jan. 21, 2006, pp. 8.
Appacts, "Smart Thinking for Super Apps," http://www.appacts.com Printed Jul. 18, 2013 in 4 pages.
Apsalar, "Data Powered Mobile Advertising," "Free Mobile App Analytics" and various analytics related screen shots http://apsalar.com Printed Jul. 18, 2013 in 8 pages.
Bhosale, Safal V., "Holy Grail of Outlier Detection Technique: A Macro Level Take on the State of the Art," International Journal of Computer Science & Information Technology, Aug. 1, 2014, retrieved

(56) References Cited

OTHER PUBLICATIONS from http://www.ijcsit.com/docs/Volume5/vol5issue04/ijcsit20140504226.pdf retrieved May 3, 2016.
Bluttman et al., "Excel Formulas and Functions for Dummies," 2005, Wiley Publishing, Inc., pp. 280, 284-286.
Boyce, Jim, "Microsoft Outlook 2010 Inside Out," Aug. 1, 2010, retrieved from the internet https://capdtron.files.wordpress.com/2013/01/outlook-2010-inside_out.pdf.
Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.
Canese et al., "Chapter 2: PubMed: The Bibliographic Database," The NCBI Handbook, Oct. 2002, pp. 1-10.
Capptain—Pilot Your Apps, http://www.capptain.com Printed Jul. 18, 2013 in 6 pages.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Chung, Chin-Wan, "Dataplex: An Access to Heterogeneous Distributed Databases", Communications of the ACM, Association for Computing Machinery, Inc., vol. 33, Issue No. 1, pp. 70-80, Jan. 1, 1990.
Conner, Nancy, "Google Apps: The Missing Manual," May 1, 2008, pp. 15.
Countly Mobile Analytics, http://count.ly/ Printed Jul. 18, 2013 in 9 pages.
Definition "Identify", downloaded Jan. 22, 2015, 1 page.
Definition "Overlay", downloaded Jan. 22, 2015, 1 page.
Delcher et al., "Identifying Bacterial Genes and Endosymbiont DNA with Glimmer," BioInformatics, vol. 23, No. 6, 2007, pp. 673-679.
Distimo—App Analytics, http://www.distimo.com/app-analytics Printed Jul. 18, 2013 in 5 pages.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
Flurry Analytics, http://www.flurry.com/ Printed Jul. 18, 2013 in 14 pages.
Gesher, Ari, "Palantir Screenshots in the Wild: Swing Sightings," The Palantir Blog, Sep. 11, 2007, pp. 1-12.
GIS-NET 3 Public_Department of Regional Planning. Planning & Zoning Information for Unincorporated LA County. Retrieved Oct. 2, 2013 from http://gis.planning.lacounty.gov/GIS-NET3_Public/Viewer.html.
Golmohammadi et al., "Data Mining Applications for Fraud Detection in Securities Market," Intelligence and Security Informatics Conference (EISIC), 2012 European, IEEE, Aug. 22, 2012, pp. 107-114.
Google Analytics Official Website—Web Analytics & Reporting, http://www.google.com/analytics.index.html Printed Jul. 18, 2013 in 22 pages.
Gorr et al., "Crime Hot Spot Forecasting: Modeling and Comparative Evaluation", Grant 98-IJ-CX-K005, May 6, 2002, 37 pages.
Goswami, Gautam, "Quite Writly Said!," One Brick at a Time, Aug. 21, 2005, pp. 7.
Griffith, Daniel A., "A Generalized Huff Model," Geographical Analysis, Apr. 1982, vol. 14, No. 2, pp. 135-144.
Gu et al., "Record Linkage: Current Practice and Future Directions," Jan. 15, 2004, pp. 32.
Gu et al., "BotMiner: Clustering Analysis of Network Traffice for Protocol-and-Structure-Independent Botnet Detection," USENIX Security Symposium, 2008, 17 pages.

Hansen et al., "Analyzing Social Media Networks with NodeXL: Insights from a Connected World", Chapter 4, pp. 53-67 and Chapter 10, pp. 143-164, published Sep. 2010.
Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.
Hibbert et al., "Prediction of Shopping Behavior Using a Huff Model Within a GIS Framework," Healthy Eating in Context, Mar. 18, 2011, pp. 16.
Hodge et al., "A Survey of Outlier Detection Methodologies," Artificial Intelligence Review, vol. 22, No. 2, Oct. 1, 2004.
Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Hua et al., "A Multi-attribute Data Structure with Parallel Bloom Filters for Network Services", HiPC 2006, LNCS 4297, pp. 277-288, 2006.
Huang et al., "Systematic and Integrative Analysis of Large Gene Lists Using DAVID Bioinformatics Resources," Nature Protocols, 4.1, 2008, 44-57.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Keylines.com, "An Introduction to KeyLines and Network Visualization," Mar. 2014, http://keylines.com/wp-content/uploads/2014/03/KeyLines-White-Paper.pdf downloaded May 12, 2014 in 8 pages.
Keylines.com, "KeyLines Datasheet," Mar. 2014, http://keylines.com/wp-content/uploads/2014/03/KeyLines-datasheet.pdf downloaded May 12, 2014 in 2 pages.
Keylines.com, "Visualizing Threats: Improved Cyber Security Through Network Visualization," Apr. 2014, http://keylines.com/wp-content/uploads/2014/04/Visualizing-Threats1.pdf downloaded May 12, 2014 in 10 pages.
Kitts, Paul, "Chapter 14: Genome Assembly and Annotation Process," The NCBI Handbook, Oct. 2002, pp. 1-21.
Kontagent Mobile Analytics, http://www.kontagent.com/ Printed Jul. 18, 2013 in 9 pages.
Li et al., "Interactive Multimodal Visual Search on Mobile Device," IEEE Transactions on Multimedia, vol. 15, No. 3, Apr. 1, 2013, pp. 594-607.
Li et al., "Identifying the Signs of Fraudulent Accounts using Data Mining Techniques," Computers in Human Behavior, vol. 28, No. 3, Jan. 16, 2012.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Localytics—Mobile App Marketing & Analytics, http://www.localytics.com/ Printed Jul. 18, 2013 in 12 pages.
Madden, Tom, "Chapter 16: The BLAST Sequence Analysis Tool," The NCBI Handbook, Oct. 2002, pp. 1-15.
Manno et al., "Introducing Collaboration in Single-user Applications through the Centralized Control Architecture," 2010, pp. 10.
Manske, "File Saving Dialogs," http://www.mozilla.org/editor/ui_specs/FileSaveDialogs.html, Jan. 20, 1999, pp. 7.
Map Builder, "Rapid Mashup Development Tool for Google and Yahoo Maps!" http://web.archive.org/web/20090626224734/http://www.mapbuilder.net/ printed Jul. 20, 2012 in 2 pages.
Map of San Jose, CA. Retrieved Oct. 2, 2013 from http://maps.yahoo.com.
Map of San Jose, CA. Retrieved Oct. 2, 2013 from http://maps.bing.com.
Map of San Jose, CA. Retrieved Oct. 2, 2013 from http://maps.google.com.

(56) References Cited

OTHER PUBLICATIONS

Microsoft—Developer Network, "Getting Started with VBA in Word 2010," Apr. 2010, http://msdn.microsoft.com/en-us/library/ff604039%28v=office.14%29.aspx as printed Apr. 4, 2014 in 17 pages.
Microsoft Office—Visio, "About connecting shapes," http://office.microsoft.com/en-us/visio-help/about-connecting-shapes-HP085050369.aspx printed Aug. 4, 2011 in 6 pages.
Microsoft Office—Visio, "Add and glue connectors with the Connector tool," http://office.microsoft.com/en-us/visio-help/add-and-glue-connectors-with-the-connector-tool-HA010048532.aspx?CTT=1 printed Aug. 4, 2011 in 1 page.
Mixpanel—Mobile Analytics, https://mixpanel.com/ Printed Jul. 18, 2013 in 13 pages.
Mizrachi, Ilene, "Chapter 1: GenBank: The Nuckeotide Sequence Database," The NCBI Handbook, Oct. 2002, pp. 1-14.
Ngai et al., "The Application of Data Mining Techniques in Financial Fraud Detection: A Classification Frameworok and an Academic Review of Literature," Decision Support Systems, Elsevier Science Publishers, Amsterdam, Netherlands, vol. 50, No. 3, Feb. 1, 2011.
Nierman, "Evaluating Structural Similarity in XML Documents", 6 pages, 2002.
Nolan et al., "MCARTA: A Malicious Code Automated Run-Time Analysis Framework," Homeland Security (HST) 2012 IEEE Conference on Technologies for, Nov. 13, 2012, pp. 13-17.
Olanoff, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Open Web Analytics (OWA), http://www.openwebanalytics.com/ Printed Jul. 19, 2013 in 5 pages.
Palantir Technologies, "Palantir Labs_Timeline," Oct. 1, 2010, retrieved from the internet https://www.youtube.com/watch?v=JCgDW5bru9M.
Palmas et al., "An Edge-Bunding Layout for Interactive Parallel Coordinates" 2014 IEEE Pacific Visualization Symposium, pp. 57-64.
Piwik—Free Web Analytics Software. http://piwik.org/ Printed Jul. 19, 2013 in18 pages.
Quartert FS "Managing Business Performance and Detecting Outliers in Financial Services," Oct. 16, 2014, retrieved from https://quartetfs.com/images/pdf/white-papers/Quartet_FS_White_Paper_-_ActivePivot_Sentinel.pdf retrieved on May 3, 2016.
Quartert FS "Resource Center," Oct. 16, 2014, retrieved from https://web.archive.org/web/20141016044306/http://quartetfs.com/resource-center/white-papers retrieved May 3, 2016.
Quest, "Toad for ORACLE 11.6—Guide to Using Toad," Sep. 24, 2012, pp. 1-162.
Rouse, Margaret, "OLAP Cube," http://searchdatamanagement.techtarget.com/definition/OLAP-cube, Apr. 28, 2012, pp. 16.
Shah, Chintan, "Periodic Connections to Control Server Offer New Way to Detect Botnets," Oct. 24, 2013 in 6 pages, http://www.blogs.mcafee.com/mcafee-labs/periodic-links-to-control-server-offer-new-way-to-detect-botnets.
Shi et al., "A Scalable Implementation of Malware Detection Based on Network Connection Behaviors," 2013 International Conference on Cyber-Enabled Distributed Computing and Knowledge Discovery, IEEE, Oct. 10, 2013, pp. 59-66.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
StatCounter—Free Invisible Web Tracker, Hit Counter and Web Stats, http://statcounter.com/ Printed Jul. 19, 2013 in 17 pages.
Symantec Corporation, "E-Security Begins with Sound Security Policies," Announcement Symantec, Jun. 14, 2001.
TestFlight—Beta Testing on the Fly, http://testflightapp.com/ Printed Jul. 18, 2013 in 3 pages.
Thompson, Mick, "Getting Started with GEO," Getting Started with GEO, Jul. 26, 2011.
trak.io, http://trak.io/ printed Jul. 18, 2013 in 3 pages.
Umagandhi et al., "Search Query Recommendations Using Hybrid User Profile with Query Logs," International Journal of Computer Applications, vol. 80, No. 10, Oct. 1, 2013, pp. 7-18.
UserMetrix, http://usermetrix.com/android-analytics printed Jul. 18, 2013 in 3 pages.
Valentini et al., "Ensembles of Learning Machines", M. Marinaro and R. Tagliaferri (Eds.): WIRN VIETRI 2002, LNCS 2486, pp. 3-20.
Vose et al., "Help File for ModelRisk Version 5," 2007, Vose Software, pp. 349-353. [Uploaded in 2 Parts].
Wiggerts, T.A., "Using Clustering Algorithms in Legacy Systems Remodularization," Reverse Engineering, Proceedings of the Fourth Working Conference, Netherlands, Oct. 6-8, 1997, IEEE Computer Soc., pp. 33-43.
Wikipedia, "Federated Database System," Sep. 7, 2013, retrieved from the internet on Jan. 27, 2015 http://en.wikipedia.org/w/index.php?title=Federated_database_system&oldid=571954221.
Wright et al., "Palantir Technologies VAST 2010 Challenge Text Records _ Investigations into Arms Dealing," Oct. 29, 2010, pp. 1-10.
Yang et al., "HTML Page Analysis Based on Visual Cues", A129, pp. 859-864, 2001.
International Search Report and Written Opinion in Application No. PCT/US2009/056703, dated Mar. 15, 2010.
Notice of Acceptance for Australian Patent Application No. 2014250678 dated Oct. 7, 2015.
Notice of Allowance for U.S. Appl. No. 12/556,318 dated Nov. 2, 2015.
Notice of Allowance for U.S. Appl. No. 14/102,394 dated Aug. 25, 2014.
Notice of Allowance for U.S. Appl. No. 14/108,187 dated Aug. 29, 2014.
Notice of Allowance for U.S. Appl. No. 14/135,289 dated Oct. 14, 2014.
Notice of Allowance for U.S. Appl. No. 14/139,628 dated Jun. 24, 2015.
Notice of Allowance for U.S. Appl. No. 14/139,640 dated Jun. 17, 2015.
Notice of Allowance for U.S. Appl. No. 14/139,713 dated Jun. 12, 2015.
Notice of Allowance for U.S. Appl. No. 14/148,568 dated Aug. 26, 2015.
Notice of Allowance for U.S. Appl. No. 14/192,767 dated Dec. 16, 2014.
Notice of Allowance for U.S. Appl. No. 14/225,084 dated May 4, 2015.
Notice of Allowance for U.S. Appl. No. 14/264,445 dated May 14, 2015.
Notice of Allowance for U.S. Appl. No. 14/268,964 dated Dec. 3, 2014.
Notice of Allowance for U.S. Appl. No. 14/278,963 dated Sep. 2, 2015.
Notice of Allowance for U.S. Appl. No. 14/294,098 dated Dec. 29, 2014.
Notice of Allowance for U.S. Appl. No. 14/323,935 dated Oct. 1, 2015.
Notice of Allowance for U.S. Appl. No. 14/326,738 dated Nov. 18, 2015.
Notice of Allowance for U.S. Appl. No. 14/473,552 dated Jul. 24, 2015.
Notice of Allowance for U.S. Appl. No. 14/473,860 dated Feb. 27, 2015.
Notice of Allowance for U.S. Appl. No. 14/479,863 dated Mar. 31, 2015.
Notice of Allowance for U.S. Appl. No. 14/486,991 dated May 1, 2015.
Notice of Allowance for U.S. Appl. No. 14/504,103 dated May 18, 2015.

(56) References Cited

OTHER PUBLICATIONS

Notice of Allowance for U.S. Appl. No. 14/579,752 dated Apr. 4, 2016.
Notice of Allowance for U.S. Appl. No. 14/616,080 dated Apr. 2, 2015.
Notice of Allowance for U.S. Appl. No. 14/698,432 dated Sep. 28, 2016.
Notice of Allowance for U.S. Appl. No. 14/816,748 dated Oct. 19, 2016.
Notice of Allowance for U.S. Appl. No. 15/072,174 dated Jul. 13, 2016.
Official Communication for Australian Patent Application No. 2014201511 dated Feb. 27, 2015.
Official Communication for Australian Patent Application No. 2014202442 dated Mar. 19, 2015.
Official Communication for Australian Patent Application No. 2014210604 dated Jun. 5, 2015.
Official Communication for Australian Patent Application No. 2014210614 dated Jun. 5, 2015.
Official Communication for Australian Patent Application No. 2014213553 dated May 7, 2015.
Official Communication for Australian Patent Application No. 2014250678 dated Jun. 17, 2015.
Official Communication for European Patent Application No. 14158861.6 dated Jun. 16, 2014.
Official Communication for European Patent Application No. 14159464.8 dated Jul. 31, 2014.
Official Communication for European Patent Application No. 14159535.5 dated May 22, 2014.
Official Communication for European Patent Application No. 14180142.3 dated Feb. 6, 2015.
Official Communication for European Patent Application No. 14180281.9 dated Jan. 26, 2015.
Official Communication for European Patent Application No. 14180321.3 dated Apr. 17, 2015.
Official Communication for European Patent Application No. 14180432.8 dated Jun. 23, 2015.
Official Communication for European Patent Application No. 14186225.0 dated Feb. 13, 2015.
Official Communication for European Patent Application No. 14187739.9 dated Jul. 6, 2015.
Official Communication for European Patent Application No. 14187996.5 dated Feb. 12, 2015.
Official Communication for European Patent Application No. 14189344.6 dated Feb. 20, 2015.
Official Communication for European Patent Application No. 14189347.9 dated Mar. 4, 2015.
Official Communication for European Patent Application No. 14189802.3 dated May 11, 2015.
Official Communication for European Patent Application No. 14191540.5 dated May 27, 2015.
Official Communication for European Patent Application No. 14197879.1 dated Apr. 28, 2015.
Official Communication for European Patent Application No. 14197895.7 dated Apr. 28, 2015.
Official Communication for European Patent Application No. 14197938.5 dated Apr. 28, 2015.
Official Communication for European Patent Application No. 14199182.8 dated Mar. 13, 2015.
Official Communication for European Patent Application No. 15155845.9 dated Oct. 6, 2015.
Official Communication for European Patent Application No. 15155846.7 dated Jul. 8, 2015.
Official Communication for European Patent Application No. 15156004.2 dated Aug. 24, 2015.
Official Communication for European Patent Application No. 15165244.3 dated Aug. 27, 2015.
Official Communication for European Patent Application No. 15175151.8 dated Nov. 25, 2015.
Official Communication for European Patent Application No. 15180515.7 dated Dec. 14, 2015.
Official Communication for European Patent Application No. 15183721.8 dated Nov. 23, 2015.
Official Communication for European Patent Application No. 15193287.8 dated Apr. 1, 2016.
Official Communication for European Patent Application No. 15201727.3 dated May 23, 2016.
Official Communication for European Patent Application No. 15202090.5 dated May 13, 2016.
Official Communication for European Patent Application No. 16183052.6 dated Dec. 12, 2016.
Official Communication for Great Britain Patent Application No. 1404457.2 dated Aug. 14, 2014.
Official Communication for Great Britain Patent Application No. 1404486.1 dated May 21, 2015.
Official Communication for Great Britain Patent Application No. 1404486.1 dated Aug. 27, 2014.
Official Communication for Great Britain Patent Application No. 1404489.5 dated May 21, 2015.
Official Communication for Great Britain Patent Application No. 1404489.5 dated Aug. 27, 2014.
Official Communication for Great Britain Patent Application No. 1404489.5 dated Oct. 6, 2014.
Official Communication for Great Britain Patent Application No. 1404499.4 dated Aug. 20, 2014.
Official Communication for Great Britain Patent Application No. 1404574.4 dated Dec. 18, 2014.
Official Communication for Great Britain Patent Application No. 1411984.6 dated Dec. 22, 2014.
Official Communication for Great Britain Patent Application No. 1413935.6 dated Jan. 27, 2015.
Official Communication for Netherlands Patent Application No. 2012433 dated Mar. 11, 2016.
Official Communication for Netherlands Patent Application No. 2012437 dated Sep. 18, 2015.
Official Communication for Netherlands Patent Application No. 2013306 dated Apr. 24, 2015.
Official Communication for New Zealand Patent Application No. 622181 dated Mar. 24, 2014.
Official Communication for New Zealand Patent Application No. 622439 dated Mar. 24, 2014.
Official Communication for New Zealand Patent Application No. 622439 dated Jun. 6, 2014.
Official Communication for New Zealand Patent Application No. 622473 dated Jun. 19, 2014.
Official Communication for New Zealand Patent Application No. 622473 dated Mar. 27, 2014.
Official Communication for New Zealand Patent Application No. 622513 dated Apr. 3, 2014.
Official Communication for New Zealand Patent Application No. 622517 dated Apr. 3, 2014.
Official Communication for New Zealand Patent Application No. 624557 dated May 14, 2014.
Official Communication for New Zealand Patent Application No. 627061 dated Jul. 14, 2014.
Official Communication for New Zealand Patent Application No. 627962 dated Aug. 5, 2014.
Official Communication for New Zealand Patent Application No. 628150 dated Aug. 15, 2014.
Official Communication for New Zealand Patent Application No. 628161 dated Aug. 25, 2014.
Official Communication for New Zealand Patent Application No. 628263 dated Aug. 12, 2014.
Official Communication for New Zealand Patent Application No. 628495 dated Aug. 19, 2014.
Official Communication for New Zealand Patent Application No. 628585 dated Aug. 26, 2014.
Official Communication for New Zealand Patent Application No. 628840 dated Aug. 28, 2014.
Official Communication for U.S. Appl. No. 12/556,318 dated Jul. 2, 2015.

(56) References Cited

OTHER PUBLICATIONS

Official Communication for U.S. Appl. No. 13/247,987 dated Apr. 2, 2015.
Official Communication for U.S. Appl. No. 13/247,987 dated Sep. 22, 2015.
Official Communication for U.S. Appl. No. 13/827,491 dated Dec. 1, 2014.
Official Communication for U.S. Appl. No. 13/831,791 dated Mar. 4, 2015.
Official Communication for U.S. Appl. No. 13/831,791 dated Aug. 6, 2015.
Official Communication for U.S. Appl. No. 13/835,688 dated Jun. 17, 2015.
Official Communication for U.S. Appl. No. 13/839,026 dated Aug. 4, 2015.
Official Communication for U.S. Appl. No. 14/134,558 dated Oct. 7, 2015.
Official Communication for U.S. Appl. No. 14/139,628 dated Jan. 5, 2015.
Official Communication for U.S. Appl. No. 14/139,640 dated Dec. 15, 2014.
Official Communication for U.S. Appl. No. 14/139,713 dated Dec. 15, 2014.
Official Communication for U.S. Appl. No. 14/148,568 dated Oct. 22, 2014.
Official Communication for U.S. Appl. No. 14/148,568 dated Mar. 26, 2015.
Official Communication for U.S. Appl. No. 14/196,814 dated May 5, 2015.
Official Communication for U.S. Appl. No. 14/225,006 dated Sep. 10, 2014.
Official Communication for U.S. Appl. No. 14/225,006 dated Sep. 2, 2015.
Official Communication for U.S. Appl. No. 14/225,006 dated Feb. 27, 2015.
Official Communication for U.S. Appl. No. 14/225,084 dated Sep. 11, 2015.
Official Communication for U.S. Appl. No. 14/225,084 dated Sep. 2, 2014.
Official Communication for U.S. Appl. No. 14/225,084 dated Feb. 20, 2015.
Official Communication for U.S. Appl. No. 14/225,160 dated Feb. 11, 2015.
Official Communication for U.S. Appl. No. 14/225,160 dated Aug. 12, 2015.
Official Communication for U.S. Appl. No. 14/225,160 dated May 20, 2015.
Official Communication for U.S. Appl. No. 14/225,160 dated Oct. 22, 2014.
Official Communication for U.S. Appl. No. 14/225,160 dated Jul. 29, 2014.
Official Communication for U.S. Appl. No. 14/251,485 dated Oct. 1, 2015.
Official Communication for U.S. Appl. No. 14/264,445 dated Apr. 17, 2015.
Official Communication for U.S. Appl. No. 14/268,964 dated Sep. 3, 2014.
Official Communication for U.S. Appl. No. 14/278,963 dated Jan. 30, 2015.
Official Communication for U.S. Appl. No. 14/289,596 dated Jul. 18, 2014.
Official Communication for U.S. Appl. No. 14/289,596 dated Jan. 26, 2015.
Official Communication for U.S. Appl. No. 14/289,596 dated Apr. 30, 2015.
Official Communication for U.S. Appl. No. 14/289,599 dated Jul. 22, 2014.
Official Communication for U.S. Appl. No. 14/289,599 dated May 29, 2015.
Official Communication for U.S. Appl. No. 14/289,599 dated Sep. 4, 2015.
Official Communication for U.S. Appl. No. 14/294,098 dated Aug. 15, 2014.
Official Communication for U.S. Appl. No. 14/294,098 dated Nov. 6, 2014.
Official Communication for U.S. Appl. No. 14/306,138 dated Sep. 14, 2015.
Official Communication for U.S. Appl. No. 14/306,138 dated Feb. 18, 2015.
Official Communication for U.S. Appl. No. 14/306,138 dated Sep. 23, 2014.
Official Communication for U.S. Appl. No. 14/306,138 dated May 26, 2015.
Official Communication for U.S. Appl. No. 14/306,138 dated Dec. 3, 2015.
Official Communication for U.S. Appl. No. 14/306,147 dated Feb. 19, 2015.
Official Communication for U.S. Appl. No. 14/306,147 dated Aug. 7, 2015.
Official Communication for U.S. Appl. No. 14/306,147 dated Sep. 9, 2014.
Official Communication for U.S. Appl. No. 14/306,154 dated Mar. 11, 2015.
Official Communication for U.S. Appl. No. 14/306,154 dated May 15, 2015.
Official Communication for U.S. Appl. No. 14/306,154 dated Nov. 16, 2015.
Official Communication for U.S. Appl. No. 14/306,154 dated Jul. 6, 2015.
Official Communication for U.S. Appl. No. 14/306,154 dated Sep. 9, 2014.
Official Communication for U.S. Appl. No. 14/319,161 dated Jan. 23, 2015.
Official Communication for U.S. Appl. No. 14/319,765 dated Sep. 10, 2015.
Official Communication for U.S. Appl. No. 14/319,765 dated Jun. 16, 2015.
Official Communication for U.S. Appl. No. 14/319,765 dated Nov. 25, 2014.
Official Communication for U.S. Appl. No. 14/319,765 dated Feb. 4, 2015.
Official Communication for U.S. Appl. No. 14/323,935 dated Jun. 22, 2015.
Official Communication for U.S. Appl. No. 14/323,935 dated Nov. 28, 2014.
Official Communication for U.S. Appl. No. 14/323,935 dated Mar. 31, 2015.
Official Communication for U.S. Appl. No. 14/326,738 dated Dec. 2, 2014.
Official Communication for U.S. Appl. No. 14/326,738 dated Jul. 31, 2015.
Official Communication for U.S. Appl. No. 14/326,738 dated Mar. 31, 2015.
Official Communication for U.S. Appl. No. 14/451,221 dated Oct. 21, 2014.
Official Communication for U.S. Appl. No. 14/463,615 dated Nov. 13, 2014.
Official Communication for U.S. Appl. No. 14/463,615 dated May 21, 2015.
Official Communication for U.S. Appl. No. 14/463,615 dated Jan. 28, 2015.
Official Communication for U.S. Appl. No. 14/473,552 dated Feb. 24, 2015.
Official Communication for U.S. Appl. No. 14/473,860 dated Nov. 4, 2014.
Official Communication for U.S. Appl. No. 14/483,527 dated Jan. 28, 2015.
Official Communication for U.S. Appl. No. 14/486,991 dated Mar. 10, 2015.
Official Communication for U.S. Appl. No. 14/490,612 dated Aug. 18, 2015.

(56) References Cited

OTHER PUBLICATIONS

Official Communication for U.S. Appl. No. 14/504,103 dated Feb. 5, 2015.
Official Communication for U.S. Appl. No. 14/518,757 dated Dec. 1, 2015.
Official Communication for U.S. Appl. No. 14/518,757 dated Apr. 2, 2015.
Official Communication for U.S. Appl. No. 14/518,757 dated Jul. 20, 2015.
Official Communication for U.S. Appl. No. 14/571,098 dated Mar. 11, 2015.
Official Communication for U.S. Appl. No. 14/579,752 dated Aug. 19, 2015.
Official Communication for U.S. Appl. No. 14/579,752 dated May 26, 2015.
Official Communication for U.S. Appl. No. 14/579,752 dated Dec. 9, 2015.
Official Communication for U.S. Appl. No. 14/581,920 dated Mar. 1, 2016.
Official Communication for U.S. Appl. No. 14/581,920 dated Jun. 13, 2016.
Official Communication for U.S. Appl. No. 14/581,920 dated May 3, 2016.
Official Communication for U.S. Appl. No. 14/631,633 dated Sep. 10, 2015.
Official Communication for U.S. Appl. No. 14/639,606 dated Oct. 16, 2015.
Official Communication for U.S. Appl. No. 14/639,606 dated May 18, 2015.
Official Communication for U.S. Appl. No. 14/639,606 dated Jul. 24, 2015.
Official Communication for U.S. Appl. No. 14/639,606 dated Apr. 5, 2016.
Official Communication for U.S. Appl. No. 14/698,432 dated Jun. 3, 2016.
Official Communication for U.S. Appl. No. 14/726,353 dated Mar. 1, 2016.
Official Communication for U.S. Appl. No. 14/726,353 dated Sep. 10, 2015.
Official Communication for U.S. Appl. No. 14/813,749 dated Sep. 28, 2015.
Official Communication for U.S. Appl. No. 14/816,748 dated Apr. 1, 2016.
Official Communication for U.S. Appl. No. 14/816,748 dated May 24, 2016.
Official Communication for U.S. Appl. No. 14/857,071 dated Mar. 2, 2016.
Official Communication for U.S. Appl. No. 15/072,174 dated Jun. 1, 2016.
Official Communication for U.S. Appl. No. 15/253,717 dated Dec. 1, 2016.
Restriction Requirement for U.S. Appl. No. 13/839,026 dated Apr. 2, 2015.
Restriction Requirement for U.S. Appl. No. 14/857,071 dated Dec. 11, 2015.
Baker et al., "The Development of a Common Enumeration of Vulnerabilities and Exposures," Presented at the Second International Workshop on Recent Advances in Intrusion Detection, Sep. 7-9, 1999, pp. 35.
Bhuyan et al., "Network Anomaly Detection: Methods, Systems and Tools," First Quarter 2014, IEEE.
Crosby et al., "Efficient Data Structures for Tamper-Evident Logging," Department of Computer Science, Rice University, 2009, pp. 17.
FireEye—Products and Solutions Overview, http://www.fireeye.com/products-and-solutions Printed Jun. 30, 2014 in 3 pages.
FireEye, http://www.fireeye.com/ Printed Jun. 30, 2014 in 2 pages.
Glaab et al., "EnrichNet: Network-Based Gene Set Enrichment Analysis," Bioinformatics 28.18 (2012): pp. i451-i457.
Hur et al., "SciMiner: web-based literature mining tool for target identification and functional enrichment analysis," Bioinformatics 25.6 (2009): pp. 838-840.
Lee et al., "A Data Mining and CIDF Based Approach for Detecting Novel and Distributed Intrusions," Lecture Notes in Computer Science, vol. 1907 Nov. 11, 2000, pp. 49-65.
Ma et al., "A New Approach to Secure Logging," ACM Transactions on Storage, vol. 5, No. 1, Article 2, Published Mar. 2009, 21 pages.
Schneier et al., "Automatic Event Stream Notarization Using Digital Signatures," Security Protocols, International Workshop Apr. 1996 Proceedings, Springer-Veriag, 1997, pp. 155-169, https://schneier.com/paper-event-stream.pdf.
Schneier et al., "Cryptographic Support for Secure Logs on Untrusted Machines," The Seventh USENIX Security Symposium Proceedings, USENIX Press, Jan. 1998, pp. 53-62, https://www.schneier.com/paper-secure-logs.pdf.
VirusTotal—About, http://www.virustotal.com/en/about/ Printed Jun. 30, 2014 in 8 pages.
Waters et al., "Building an Encrypted and Searchable Audit Log," Published Jan. 9, 2004, 11 pages, http://www.parc.com/content/attachments/building_encrypted_searchable_5059_parc.pdf.
Zheng et al., "GOEAST: a web-based software toolkit for Gene Ontology enrichment analysis," Nucleic acids research 36.suppl 2 (2008): pp. W385-W363.
Notice of Allowance for U.S. Appl. No. 14/033,076 dated Mar. 11, 2016.
Notice of Allowance for U.S. Appl. No. 14/223,918 dated Jan. 6, 2016.
Notice of Allowance for U.S. Appl. No. 14/473,860 dated Jan. 5, 2015.
Notice of Allowance for U.S. Appl. No. 14/823,935 dated Apr. 25, 2016.
Notice of Allowance for U.S. Appl. No. 14/970,317 dated May 26, 2016.
Official Communication for European Patent Application No. 14199180.2 dated Jun. 22, 2015.
Official Communication for European Patent Application No. 14199180.2 dated Aug. 31, 2015.
Official Communication for European Patent Application No. 15175106.2 dated Nov. 5, 2015.
Official Communication for European Patent Application No. 15180985.2 dated Jan. 15, 2016.
Official Communication for U.S. Appl. No. 14/223,918 dated Jun. 8, 2015.
Official Communication for U.S. Appl. No. 14/280,490 dated Jul. 24, 2014.
Official Communication for U.S. Appl. No. 14/479,863 dated Dec. 26, 2014.
Official Communication for U.S. Appl. No. 14/490,612 dated Jan. 27, 2015.
Official Communication for U.S. Appl. No. 14/490,612 dated Mar. 31, 2015.
Official Communication for U.S. Appl. No. 14/731,312 dated Apr. 14, 2016.
Official Communication for U.S. Appl. No. 14/823,935 dated Dec. 4, 2015.
Official Communication for U.S. Appl. No. 14/923,712 dated Feb. 12, 2016.
Official Communication for U.S. Appl. No. 14/970,317 dated Mar. 21, 2016.
Official Communication for U.S. Appl. No. 14/982,699 dated Mar. 25, 2016.
Official Communication for U.S. Appl. No. 15/071,064 dated Jun. 16, 2016.
Official Communication for European Patent Application No. 14200246.8 dated Oct. 19, 2017.
Official Communication for European Patent Application No. 14200246.8 dated May 29, 2015.
Official Communication for Great Britain Patent Application No. 1408025.3 dated Nov. 6, 2014.
Official Communication for U.S. Appl. No. 14/504,103 dated Mar. 31, 2015.

(56) References Cited

OTHER PUBLICATIONS

Perdisci et al., "Behavioral Clustering of HTTP-Based Malware and Signature Generation Using Malicious Network Traces," USENIX, Mar. 18, 2010, pp. 1-14.
Official Communication for European Patent Application No. 15193287.8 dated Oct. 19, 2017.
Official Communication for U.S. Appl. No. 15/378,567 dated Jun. 30, 2017.
Official Communication for U.S. Appl. No. 15/378,567 dated Feb. 14, 2018.

* cited by examiner

FIGURE 2

Table 210 (200):

| Host IP Address | Hit Date & Time | ISP | Type |
|---|---|---|---|
| 128.4.1.1 | 2/10/2013 4:30:39pm | MOSCOW ISP SERVICE INC. | SPYWARE |
| 133.109.7.56 | 2/10/2013 4:31:02pm | AMERICAN INTERNET CO. | P2P |
| 56.56.23.145 | 2/10/2013 5:01:02pm | SAN DIEGO INTERNET | ADVERTISING |
| 128.30.4.1 | 2/10/2013 5:02:00pm | PERU ONLINE | P2P |
| 128.4.1.1 | 2/10/2013 5:04:42pm | MOSCOW ISP SERVICE INC. | MALICIOUS ATTACK |
| 133.109.7.56 | 2/11/2013 1:11:52pm | AMERICAN INTERNET CO. | SPYWARE |
| 133.109.7.42 | 2/11/2013 1:12:44am | AMERICAN INTERNET CO. | SPYWARE |
| 133.109.6.10 | 2/11/2013 1:13:54am | AMERICAN INTERNET CO. | UNKNOWN |
| 193.168.1.45 | 2/11/2013 2:30:11am | SAN DIEGO INTERNET | P2P |
| 192.168.2.3 | 2/11/2013 2:34:45am | POLYNESIA ONLINE SERVICE | ADVERTISING |
| 73.55.45.70 | 2/11/2013 2:44:07am | BARCELONA ISP, Inc. | MALICIOUS ATTACK |
| 210.22.45.69 | 2/11/2013 3:09:54am | ICELAND ISP CO. | P2P |
| 111.102.99.77 | 2/11/2013 3:14:44am | | UNKNOWN |

Table 220:

| Host IP Address | Hit Date & Time | ISP | Type |
|---|---|---|---|
| 33.109.28.50 | 6/1/2013 1:10:29am | ATHENS METROPOLIS SERV. | ADVERTISING |
| 220.221.135.130 | 6/1/2013 1:11:19am | NORTH POLE ISP | UNKNOWN |
| 3.44.78.212 | 6/1/2013 1:12:30am | KIEV INTERNET SERVICE | P2P |
| 78.45.120.124 | 6/1/2013 1:12:55am | BSP SERVICE ISP | P2P |
| 192.168.1.99 | 6/1/2013 1:14:25am | PUSAN INTERNET CO. | MALICIOUS ATTACK |
| 192.168.1.98 | 6/1/2013 1:15:12am | PUSAN INTERNET CO. | SPYWARE |
| 33.109.28.50 | 6/1/2013 1:15:29am | AMERICAN INTERNET CO. | SPYWARE |
| 33.109.28.50 | 6/1/2013 1:45:32am | AMERICAN INTERNET CO. | UNKNOWN |
| 4.154.104.12 | 6/1/2013 1:55:10am | ABCD ISP | P2P |
| 4.154.104.110 | 6/1/2013 1:55:20am | ABCD ISP | ADVERTISING |
| 33.109.28.50 | 6/1/2013 1:55:30am | NORTH POLE ISP | ADVERTISING |
| 50.20.102.49 | 6/1/2013 1:57:33am | KAMCHATKA INTERNET SERV. | P2P |
| 177.49.11.136 | 6/1/2013 1:58:40am | VLADVOSTOK ISP | UNKNOWN |

Diagram: Network 203 connects to NETWORK SERVER 250 and devices 225, 230, 235. Network 205 connects to NETWORK ACCESS DEVICE 255 and devices 240, 245.

SYSTEM AND METHOD FOR EVALUATING NETWORK THREATS AND USAGE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application is a continuation of Ser. No. 14/816,748, filed Aug. 3, 2015, which is a continuation of Ser. No. 14/479,863, filed Sep. 8, 2014, now U.S. Pat. No. 9,100,428, which is a continuation of U.S. patent application Ser. No. 14/147,402 filed Jan. 3, 2014, now U.S. Pat. No. 8,832,832. Each of these applications are hereby incorporated by reference herein in their entireties.

TECHNICAL FIELD

The present disclosure relates to systems and techniques for generating scores representing the threat reputation and usage of respective IP addresses.

BACKGROUND

Traditional IP address blacklists and whitelists have to be updated periodically and contain many false positives. Traditional methods of classifying an IP address as a threat can mistakenly classify IP addresses of employees and authorized users as threats.

SUMMARY

There is a need to generate threat reputation scores and usage scores of IP addresses based on reliability of data sources, passage of time, membership in various data sources, and/or amount of threats or uses. There is also a need to understand both the network threat potential and possible trusted affiliation of an IP address at the same time.

In accordance with one aspect, a computer system comprises one or more computer processors and a tangible storage device storing one or more modules configured for execution by the one or more computer processors in order to cause the computer system to: determine an IP address for which a threat score is to be determined; access data sources from each of one or more data sources, the data sources comprising: a plurality of recorded network threat events, date and time of each of the plurality of recorded network threat events, an originating IP address for each of the plurality of recorded network threat events, and/or an event type of each of the plurality of recorded network threat events; determine which of the data sources includes one or more occurrences of the IP address, wherein each occurrence indicates a threat by the IP address; for each of the data sources for which the IP address is a member of the corresponding data source: determine a quantity of occurrences of the IP address in the data source; determine a recency of each occurrence of the IP address in the data source, wherein recency is determined based on an amount of time between respective occurrences and a current time; determine a weighting factor for each of the data sources indicating expected accuracy of respective occurrences indicated in the data source of the data source; and determine the threat score for the IP address based at least on the determined quantity of occurrences, the recency of occurrences, and the weighting factor for each of the data sources.

In accordance with another aspect, one or more computer processors and a tangible storage device storing one or more modules configured for execution by the one or more computer processors in order to cause the computer system to: determine an IP address for which a usage score is to be determined; access network usage datasets from each of one or more data sources, the network usage datasets comprising: a plurality of recorded network usage events, date and time of each of the plurality of recorded network usage events, an originating IP address for each of the plurality of recorded network usage events, and/or an event type of each of the plurality of recorded network usage events; determine which of the network usage datasets includes one or more occurrences of the IP address, wherein each occurrence indicates a usage by the IP address; for each of the data sources for which the IP address is a member of the corresponding network usage dataset: determine a quantity of occurrences of the IP address in the data source; determine a recency of each occurrence of the IP address in the network usage dataset, wherein recency is determined based on an amount of time between date and time of respective occurrences and a current time; determine a weighting factor for each of the data sources indicating authority of each of the data sources; and determine an usage score for the IP address based at least on the determined quantity of occurrences, the recency of occurrences, and the weighting factor for each of the data sources.

In accordance with another aspect, a non-transitory computer-readable storage medium storing computer-executable instructions configured to direct a computing system to: determine an IP address for which a threat score is to be determined; access data sources from each of one or more data sources, the data sources comprising: a plurality of recorded network threat events, date and time of each of the plurality of recorded network threat events, an originating IP address for each of the plurality of recorded network threat events, and/or an event type of each of the plurality of recorded network threat events; determine which of the data sources includes one or more occurrences of the IP address, wherein each occurrence indicates a threat by the IP address; for each of the data sources for which the IP address is a member of the corresponding data source: determine a quantity of occurrences of the IP address in the data source; determine a recency of each occurrence of the IP address in the data source, wherein recency is determined based on an amount of time between respective occurrences and a current time; determine a weighting factor for each of the data sources indicating expected accuracy of respective occurrences indicated in the data source of the data source; and determine the threat score for the IP address based at least on the determined quantity of occurrences, the recency of occurrences, and the weighting factor for each of the data sources.

BRIEF DESCRIPTION OF THE DRAWINGS

FIG. 2 illustrates an embodiment of system illustrating various data sources and information collected from the various data sources.

DETAILED DESCRIPTION OF CERTAIN EMBODIMENTS

Definitions

Figure 1:
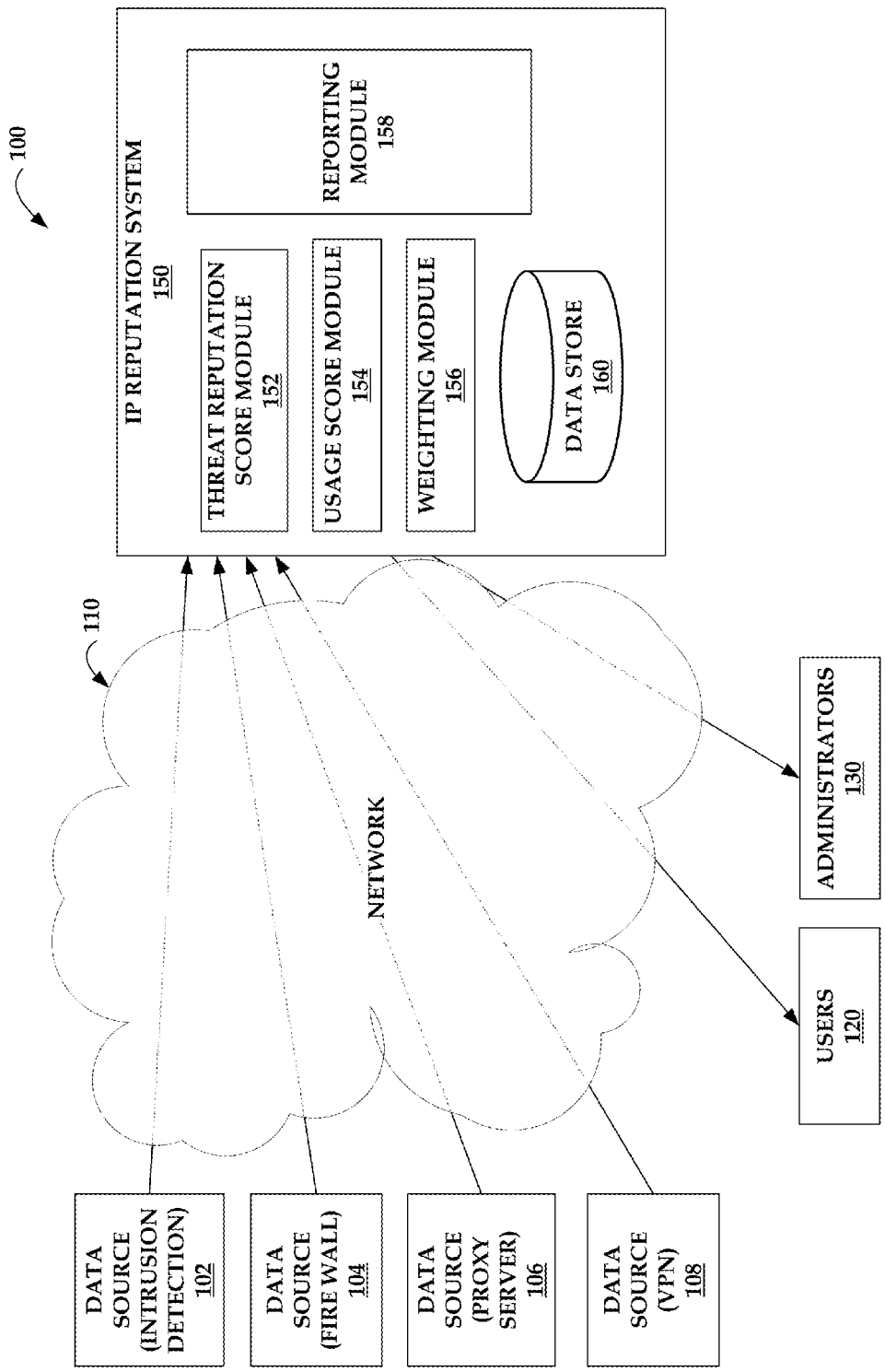
FIG. 1 illustrates one embodiment of an IP reputation system, various data sources, modules, and data flow in the system.

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Ontology: Stored information that provides a data model for storage of data in one or more databases. For example, the stored data may comprise definitions for object types and property types for data in a database, and how objects and properties may be related.

Database: A broad term for any data structure for storing and/or organizing data, including, but not limited to, relational databases (Oracle database, mySQL database, etc.), spreadsheets, XML files, and text file, among others. It is also called a data store or a data structure herein.

Data Object or Object: A data container for information representing specific things in the world that have a number of definable properties. For example, a data object can represent an entity such as a person, a place, an organization, a market instrument, or other noun. A data object can represent an event that happens at a point in time or for a certain duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., person, event, or document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Threat Reputation Score (Threat Score): A score that represents the maliciousness of an IP address. It can be a probability of an IP address being involved in an actual network security threat based on historical network security data. The score may also be called an "threat score," and/or a "risk score."

Usage Score: A score that represent a likelihood that an IP address is trusted and, therefore, is not involved in threat activities associated with an entity. For example, a usage score may indicate how actively an IP address is used by a trusted user, such as a customer, an employee, or an authorized user of an entity, as opposed to untrusted and/or unauthorized users of the entity's computing network. It is also called "customer and employee usage score."

IP Reputation System

FIG. 1 illustrates one embodiment of an IP reputation system, various data sources, modules, and data flow in the system. The system 100 includes multiple data sources, including data sources 102, 104, 106, 108, which represented different example data source types. In particular, data source 102 represents an intrusion detection system, which may include a device or application that monitors network or system activities for malicious activities or policy violations, and reports such activities to a management device or system. Data source 104 represents a firewall, which may include a device-based or application-based network security system that controls incoming and/or outgoing network traffic by analyzing data packets and determining whether the traffic should be allowed through or not, based on an applied rule set. Data source 106 represents a proxy server, which may include a computing system or an application that acts as an intermediary for requests from clients seeking resources from other computing resources. Data source 106 may include a web proxy, a database proxy, reverse proxy, and so forth. Data source 108 represents a Virtual Private Network (VPN), which may enable a computing device to send and receive data across shared or public networks as if the computing device were directly connected to the private network.

Other types of data sources, such as mobile computing devices, game servers, and so forth, may also provide input data regarding network security events. For example, a mobile device may act as a hotspot for other devices. The hotspot application installed on the mobile device may maintain a log of potential threats and also users, accounts, and/or devices that are authorized to use the hotspot. Other types of data sources not explicitly mentioned may also be used.

Data sources such as depicted in FIG. 1 may maintain logs of network traffic, including IP addresses of various computing devices that are connected to and/or request resources from the data sources. For example, a VPN usually is associated with a VPN log. The VPN log allows administrators, users, and network security analysts to determine the IP address, entities, locations, and so forth, of the computing devices that have been connected to the VPN. Similarly, a firewall log reveals a lot of information about security threat attempts at a network and also the nature of the traffic coming in and going out of the firewall. Logs from an intrusion detection system 102, a proxy server 106, and so forth usually also includes information regarding historic connection information of network traffic.

In some embodiments, some data sources, such as an intrusion detection system 102, may also maintain "black lists," which include IP addresses that the data sources deem dangerous. Some data sources publish and share such black lists periodically with the public. Some data sources maintain proprietary black lists shared only internally within an organization. Some software providers have black lists that may be included with purchase of proprietary network security software. There are also websites which allow users to check whether an IP address is included in one or many of such black lists maintained by various sources.

In some embodiments, some data sources, such as VPN 108, may include a database of trusted users, a trusted user table, or a list of authorized users or user computing devices. This may also be referred to as a "white list" or a "trusted list." For example, a VPN server may maintain one or more data tables of users who are authorized to log in to the VPN server and connect to a private network. Membership in a "white list" usually means that the user is a trusted user, an employee of an organization, or someone authorized to access a private network.

In some embodiments, various computing devices and/or users may be designated as safe so that communications with those safe computing devices are not erroneously designated as potentially dangerous. For example, in a company that tests SPAM email detection software, a testing computer that sends out SPAM emails on a regular basis may be marked as a safe computer and given access to various network resources.

The system 100 also includes a network 110, users 120 that are connected to the network 110, and administrators 130 who are connected to the network 110. The system 100 includes an IP reputation system 150, which is in communication with one or more of the data sources and provides IP reputation data to users, among other functions that are discussed herein.

Depending on the embodiment, the IP reputation system 150 may include a threat reputation score module 152, a usage score module 154, a weighting module 156, and a reporting module 158, discussed further below. The reputation system 150 may also include a data store 160. In some embodiments, the data store 160 may be located remotely from the IP reputation system 150. The IP reputation system 150 and its various modules may receive input data from data sources 102, 104, 106, 108, and other types of sources of network traffic and security data.

In general, the IP reputation system 150 accesses data at multiple data sources in order to assess characteristics of particular IP addresses. The weighting module 156 may generate weights for respective data sources based on historic accuracy of network threat reports. Depending on the embodiments, the more accurate a data source is in terms of successful past threat alerts, the more weight is assigned to incidents reported by that data source. Various methods for generating weights for respective data sources are further discussed below.

In some embodiments, the threat reputation module 152 may use network security information from the data sources 102, 104, 106, and 108 (including network threats, time, location, IP address, and so forth), weights generated by the weighting module 156, and/or additional information such as an IP address's membership in a "blacklist" or a "watch list" in a data source, to generate threat reputation scores for individual IP addresses and/or groups of IP addresses. Various methods for generating the threat reputation scores are further discussed below. Depending on the embodiment, network threats may include various suspicious, unwanted, and/or illegal activities. For example, network threats may include network attacks (e.g., denial of service attacks) and/or threats (e.g., activities that don't rise to the level of an attack, but are suspicious, unwanted, and/or illegal).

In some embodiments, the usage score module 154 may use network security information from data sources 102, 104, 106, and 108 (including network attacks, time, location, IP address, and so forth), weights generated by the weighting module 156, and/or additional information such as an IP address's membership in a trusted employee list or inclusion in a trusted user list in a data source, to generate usage scores for individual IP addresses and/or groups of IP addresses. Various methods for generating the usage scores are further discussed below.

Depending on the embodiment, the reporting module 158 may generate a user interface, a heat map, web site, or some other kinds of representation of the scores generated by the threat reputation score module 152 and/or the usage score module 154. The reporting module 158 may also send scores to the users 120 and/or administrators 130 directly in a summarized report, identifying potentially important IP addresses that the administrators 130 or the users 120 should pay special attention to. Further details regarding the reporting module 158 are discussed below.

FIG. 2 illustrates two data sources 250 and 255, and information collected from those various data sources. As shown in FIG. 2, a server computer 225, a mobile phone/computing device 230, and a personal computer 235 are all connected to the network server 250 via network 203. The network server 250 may be an email server, web server, database server, print server, file server, authentication server, or a computing node acting as a peer-to-peer server (P2P sever), and so forth. In this example, a computing node 240 and a laptop computer 245 are connected to the network access device 255 via network 205. The network access device 255 may be a router, switch, network bridge, and so forth.

In some embodiments, the network server 250 and network access device 255 each maintain a log of historic network security events that are believed to be potentially noteworthy. For example, the network server 250 may maintain a log of suspicious activities as shown in table 210. Depending on the embodiment, the log may include information such as host IP address, date and time of the hit (event), name of the Internet Service Provider (ISP) if known, and the type of event. In the example as shown in FIG. 2, the types of event include spyware, peer-to-peer (P2P), advertising, malicious attack, suspicious and/or illegal activities, and some unknown activities that could be potentially suspicious or dangerous. Depending on the embodiment, other types of threats or suspicious activities may also be included, such as sending SPAM emails, too many failed authentication requests, and so forth. Each activity, its originating IP address, date and time, and ISP information may also be included in the log. As shown in FIG. 2, the network access device 255 also maintains a log of suspicious activities as shown in table 220 in a format that is similar to table 210. Depending on the embodiment, the security events may be stored in any format and include additional and/or less information than is shown in the example tables 210 and 220.

Analyzing information stored in table 210 and table 220 can be difficult for several reasons. First, there can be many false alerts. For example, if a trusted user who has VPN or other types of access to the network server 250 has forgotten his or her password, and tried unsuccessfully to log onto the network server 250 frequently in a short period of time, this could be seen as a potential security threat and recorded in the log. A user or an administrator cannot easily tell that the IP address of the trusted user is not initiating an attack or an otherwise true alert-worthy activity. Second, a busy server of a network access device may receive a huge number of visit or resource requests per second. Therefore, the logs can be much longer than the tables 210 and 220. It is virtually impossible for humans to analyze such data. It is also slow and inefficient to spot false alerts using traditional programs that monitor such activities because traditional programs maintain a list of suspicious IP addresses or computing device identities.

Figure 3:
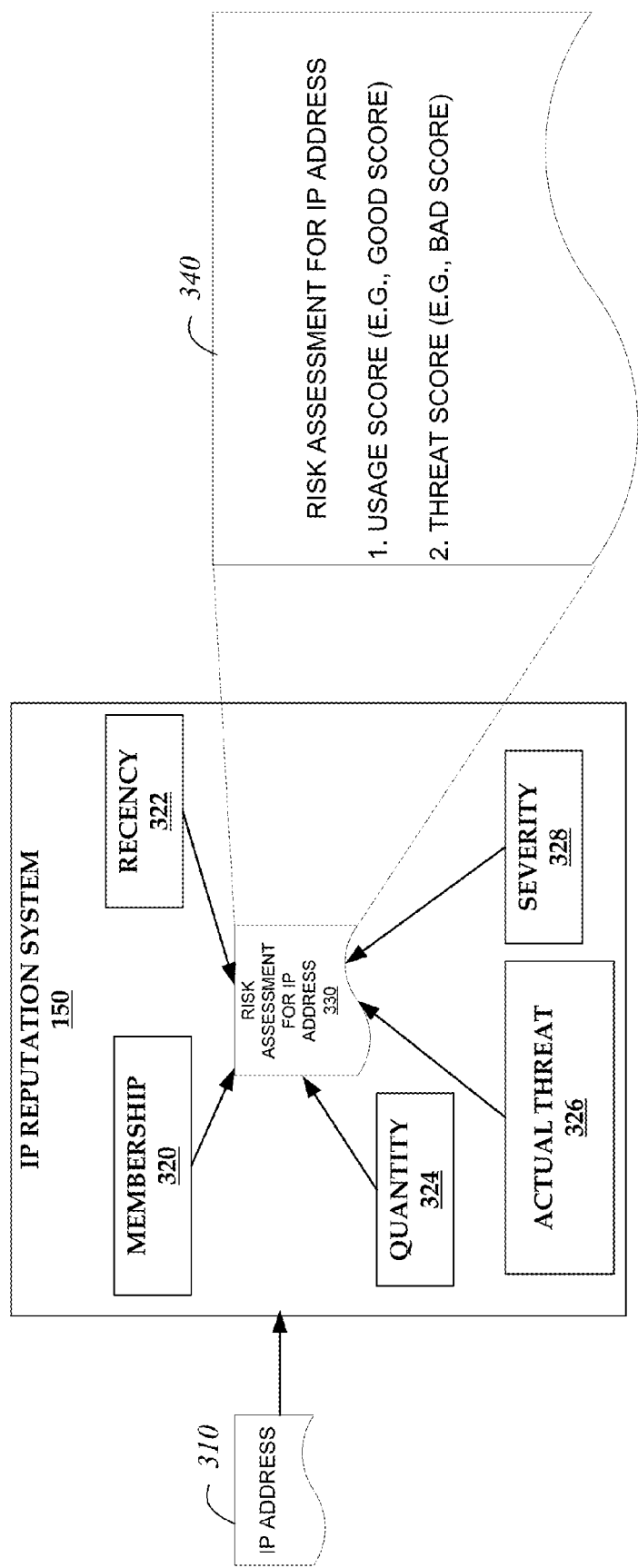
FIG. 3 illustrates an embodiment of the IP reputation system and factors considered by the system in generating threat reputation scores and usage scores.

FIG. 3 is conceptual block diagram illustrating example factors that may be considered by the system in generating threat reputation scores and usage scores, such as for a particular IP address 310. Depending on the embodiment, the IP reputation system 150 may consider data from various other data sources in determining attributes of an IP address.

As indicated in FIG. 3, membership 320 in public and/or private blacklists and trusted user lists (e.g., whitelists, such as authorized VPN users) may be considered in determining scores or other characteristics of the IP address 320.

The IP reputation system 150 may consider recency 322 of the suspicious events. Generally, the more recent a suspicious event is, the more probable that it is indicative of the risk potential of the IP address 310. Similarly, the more recent a trusted event (such as an authorized device logging into a VPN), the more probative it is regarding the trustworthiness of the IP address 310.

The IP reputation system 150 may also consider the quantity 324 of suspicious events or trusted events originating from the IP address 310. Generally, the more suspicious activities that an IP address 310 is involved in, the more likely that the IP address 310 may pose a security threat. Similarly, the more trusted events an IP address 310 is involved in, the more likely that the IP address 310 is an IP address that is used by an employee or an otherwise authorized/trusted user.

In addition, the IP reputation system 150 may also consider the severity 328 of suspicious events originating from the IP address 310. Depending on the embodiment, potentially suspicious events may be categorized according to various standards and/or conventions. For example, a malicious attack may more serious than advertising. However, the level of severity may also be adjusted or customized based on different organizational needs. For example, an organization may want to identify IP addresses that are associated with disseminating copyrighted materials online. Accordingly, the IP reputation system 150 may set the severity 328 of P2P events and potential sharing of large files higher than normal.

Moreover, severity 328 may also be affected by origin of the IP address. For example, if the IP address is from a known notorious source of hacking activities, then the severity used for calculating the threat reputation score may be higher than normal even for suspicious events of the same type.

The risk assessment 340 for the particular IP address may include both a usage score (also called a good score) and a threat reputation score (also called a threat score or a bad score). The risk assessment 340 may be provided to an entity in various formats, such as via one or more user interfaces that display usage scores, threat scores, and/or other information regarding particular IP addresses (e.g., see the example user interfaces of FIG. 4). The usage score may represent how trustworthy the IP address is. For example, if the usage score is based on the membership information 320, such as a list of trusted and/or authorized users and their device information, and the IP address 310 is associated with an employee's device (e.g., employee's cellphone) in the membership information 320, the usage score for the IP address 310 may be relatively high. In another example, if the IP address 310 has been involved in multiple actual threats based on quantity 324 and actual threat data 326, it is more likely that the IP address 310 may have a higher threat score. In some embodiments, the recency 322 and severity 328 also play important roles in determining the threat score.

Figure 4:
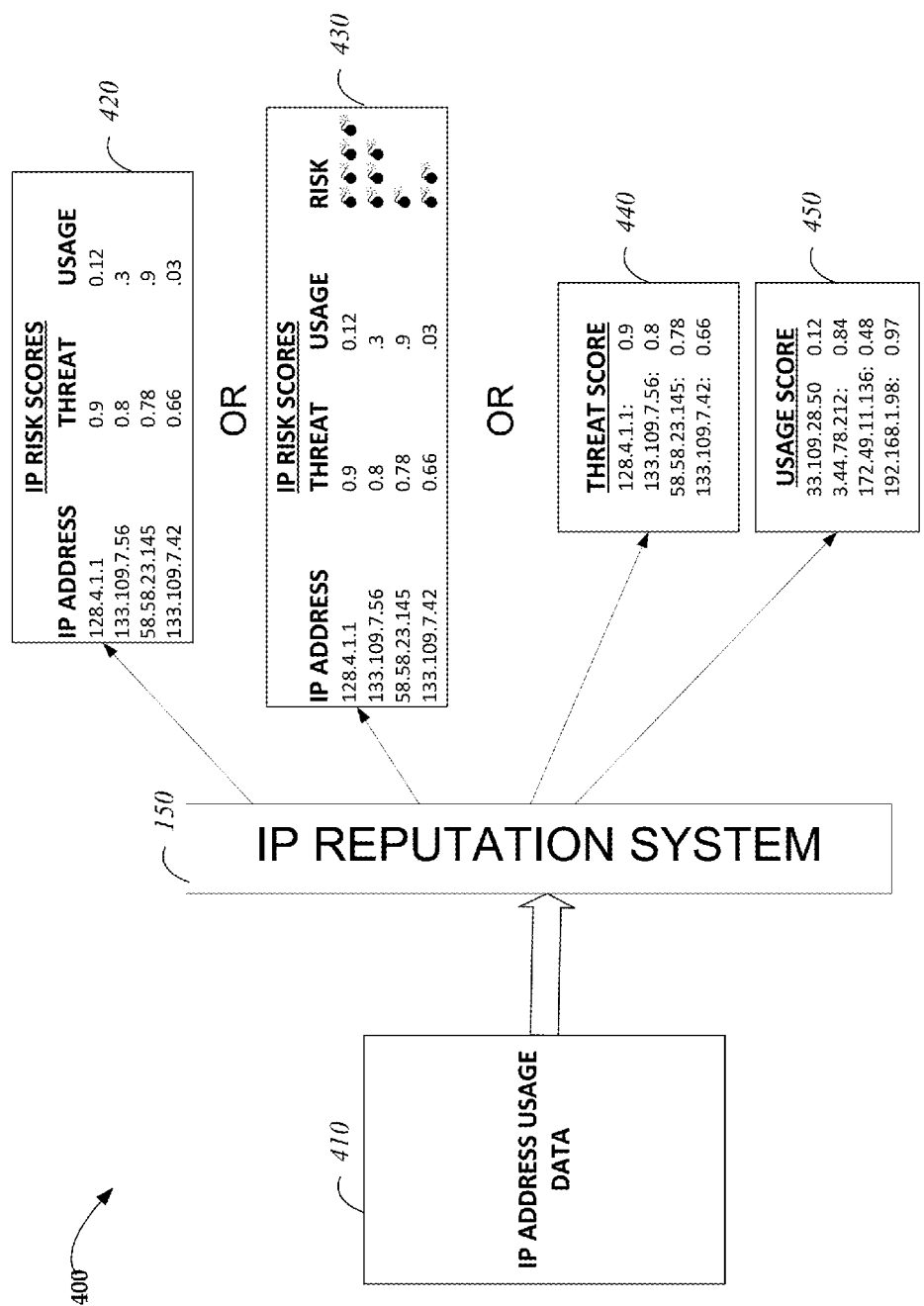
FIG. 4 illustrates three stages of generating threat reputation scores and usage scores using the IP reputation system.

FIG. 4 is a flow diagram illustrating various types of IP scoring/ratings that may be generated by the IP reputation system. The example embodiment 400 includes a list of IP addresses 410, which may also include additional information such as event type, time, originating location, settings, severity, type, and so forth, regarding respective IP addresses. During the first stage of generating the scores, the list of IP address 410 may be gathered from a variety of data sources. As discussed, the data sources may include all kinds of computing, networking, and/or mobile devices.

During the second stage of generating the scores as shown in FIG. 4, the IP reputation system 150 analyzes the IP address usage data 410, which may include various types of data, such as those illustrated in FIG. 3. In some embodiments, the IP address usage data 410 can include IP addresses, activities associated with the IP addresses, connection types, date, and time, and so forth. Because a given IP address may appear in multiple different threat data sources and each occurrence can be considered, in order to generate the scores of a given IP addresses, input data from across a plurality of data sources may be considered.

During the third stage of generating the scores, the IP reputation system 150 may generate and present scores, ratings, and/or other summary data related to the IP addresses, to various users. The scores may be presented to users in various formats via the reporting module 158. For example, a table 420 may be generated and presented to a user or an administrator. The table 420, as shown, includes four IP addresses and their respective pair of scores—a threat score and a usage score for each IP address. This format allows a user or an administrator to easily identify interesting targets for further investigation. For example, the IP address "58.58.23.145" has both a high threat reputation score (0.78) and a relatively high usage score (0.9). The high threat reputation score may be based largely on the fact that the IP address frequently appears in an intrusion detection system, while the high usage score may indicate that the IP address is used by someone with trusted access, such as an employee who regularly connects to the network with VPN. In this example, it may be unwise to simply blacklist this IP address and prohibit it from connecting in the future.

The table 430, as shown, includes additional example representations of risk levels. In this example, a "risk" representation has taken both the threat reputation score and the usage score into consideration already. For example, the IP address "58.58.23.145" has both a high threat reputation score (0.78) and a relatively high usage score (0.9). Therefore, in terms of risk, it is shown in table 430 as only having one "bomb" associated with it—less than the risk rating of two bombs given to IP address "133.109.7.42," which is associated with a lower usage score of 0.03, which may indicate that the moderate threat score of 0.66 is not mitigated by appropriate usage data associated with the IP address. Depending on the embodiment, other graphical indicators may be provided (e.g., rather than the bombs shown in example table 430), and various algorithms may be used in interpreting threat usage and/or usage scores in order to determine graphical representations.

Depending on the embodiment, the IP reputation system 150 may also generate threat reputation scores and usage scores and list them in data structures, such as example tables 440 and 450, as shown in FIG. 4. A user or an administrator may sort the scores and identify the IP addresses that are most dangerous or trustworthy, or most likely a candidate for false alarms (e.g., a score with high threat score and high usage score, etc.). The usage and threat data in these data structures may then be analyzed in various manners in order to provide an end user with the best data for consumption of the data, whether it be a risk score table such as table 420 or a risk rating graphical indicator, such as in table 430, or in some other form.

Example Threat Reputation Scoring Methods

Figure 5:
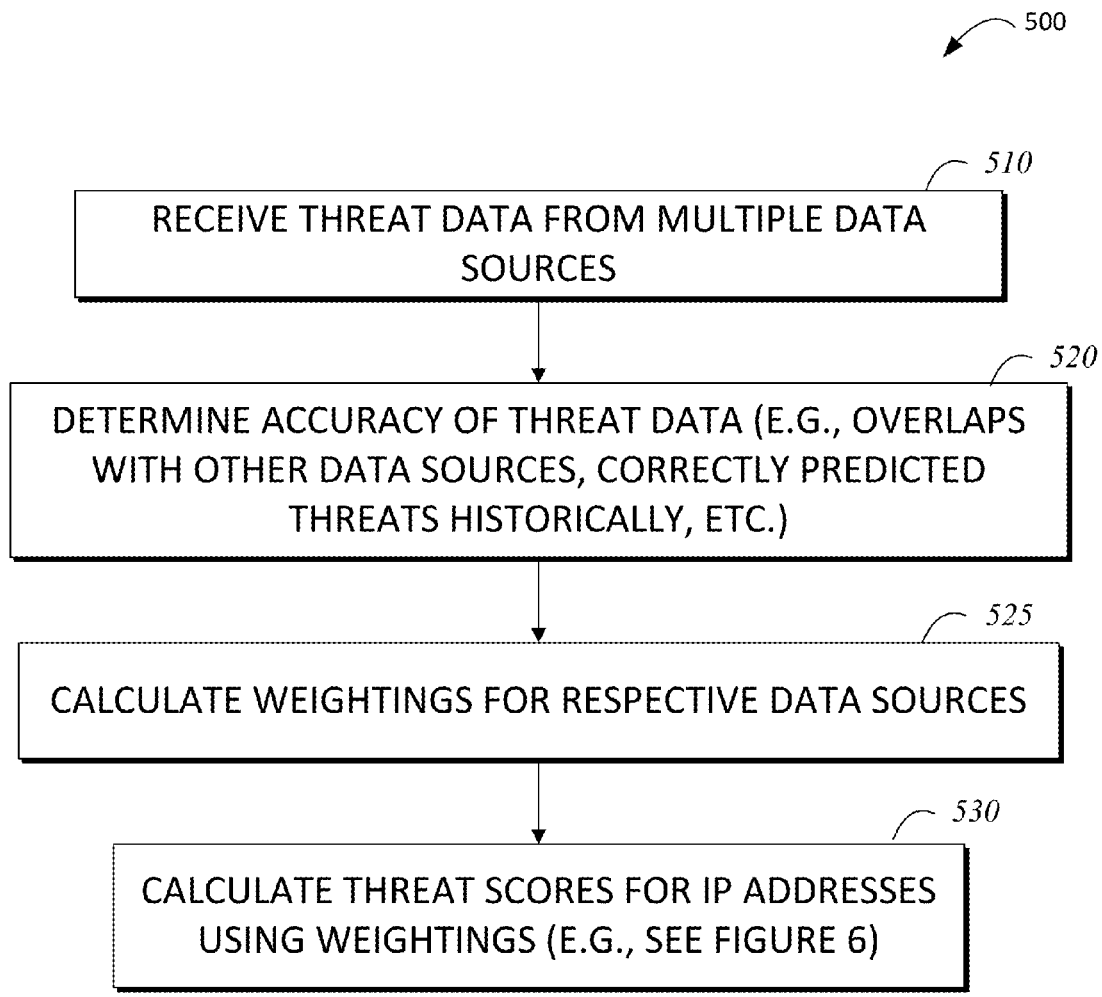
FIG. 5 is a flowchart depicting an illustrative process of determining weightings of data sources.

FIG. 5 is a flowchart depicting an illustrative process of determining weightings of data sources. The process of FIG. 5 may be performed by the IP reputation system 150 in response to input from one or more data sources, for example, such as a log from a VPN, an intrusion detection system, a computing device, a network device, a server, and so forth. However, the process may also be performed by other computing systems in some embodiments. Depending on the embodiment, the method of FIG. 5 may include fewer or additional blocks and the blocks may be performed in an order that is different than illustrated.

The process 500 begins at block 510, wherein threat related data is received from multiple data sources. As previously discussed, the IP reputation system 150 may calculate threat reputation scores using data from one or more data sources. One benefit of using data across a variety of data sources is that data sources have differing levels of data and accuracy levels of such data.

The process 500 then proceeds to block 520 and the accuracy of threat data from the one or more data sources are determined. In some embodiments, in order to determine accuracy of the various data sources, the IP reputation system 150 may compare data received from various data sources to identify overlaps. For example, if an intrusion detection system reports a suspicious activity from IP address 110.110.110.110 at 10:49 PM on Dec. 5, 2013, and a firewall installed on the same internal network also reports a suspicious activity from the same IP address 110.110.110.110 at 10:49 PM on Dec. 5, 2013, then it is more likely that both are accurate regarding this particular activity and IP address.

In some other embodiments, the IP reputation system 150 may compare the reported data from various data sources against known (e.g., confirmed) security threats. For example, the IP reputation system 150 may maintain a list of known security threats for a given period of time. The IP reputation system 150 may then identify the alerts as reported by various data sources relevant to the IPs in the known security threats during the same period of time. For example, a data source may provide threat data associated with a particular IP address on day 1, but that particular threat is not confirmed until day 10 (nine days after the data source originally indicated that there is a threat risk associated with the IP address, and before the threat could be confirmed). Because the data source accurately indicated a threat risk that turned into an actual threat, future data from that particular data source may be very valuable. Accordingly, the IP reputation system 150 may assign a high weighting to threat risk from that data source (or perhaps some subset of threat data from that data source, such as threat data of the same type that has been associated with later confirmed threats). Conversely, if a data source provides threat data that is never associated with an actual threat (e.g., within a predetermined time period after the threat data is received), the IP reputation system 150 may assign a lower weighting to that data source, or to some subset of threat data provided from that data source. Depending on the embodiment, weightings may be determined in real-time (e.g., each time a risk score for an IP address is requested), or in some scheduled manner, such as nightly based on new threat data received from various sources and confirmed threats that may be associated/linked to previously received threat data.

The process 500 then proceeds to block 525 wherein the IP reputation system 150 calculates weightings for respective data sources. In the calculation of threat reputation scores, the weights used for each data source i may be represented as a value $c_i$. Depending on the embodiment, the weight for a data source may be an estimated percentage of its IP addresses that are involved in actual threats. Depending on the embodiment, the percentage may be calculated in different ways depending on the data sources. Moreover, the weights may be updated over time or as needed.

In addition, the method of how weights are calculated can be further designed to be configurable based on the type of data source. For example, for data sources that are or similar to an alerting systems (e.g., an Intrusion Detection System or IDS), there may be reported malicious IP addresses used in actual threats in the past (e.g., historical threats that are previously recorded). For known malicious IPs used in actual threats, the IP reputation system 150 may divide the number of alerts relevant to those IP addresses by the total number of alerts during the time frame of a given actual threat. This value serves as a rough "signal-to-noise" ratio that can be used as a weight. The ratio can be more accurate if more data regarding malicious IP addresses become available. Additionally, feedback from analysts who work with these alerting systems may also be considered.

For data sources such as external blacklists (e.g., Dell™ SecureWorks), the IP reputation system 150 may estimate the percentage of IP addresses that are involved in actual threats that it predicts will be involved in threats. In some embodiments, the percentage can be calculated by counting the number of IP addresses on each blacklist that appear in alerting system data sources (e.g., intrusion detection systems, SPAM in the ProofPoint enterprise email security system, etc.) during a given time interval after the blacklist was received. In some other embodiments, actual threat data, known actual attack data (such as recorded attack events that are verified) and experiment attack data (such as attacks that are initiated for purposes of analyzing a system and/or testing the alert responses) may also be used.

In some embodiments, blacklists containing IP addresses that appear in none of the accessible alerting system data sources may be given a low default weight so that they can be configured to appear in the IP address's reputation summary, but do not have a large impact on the score. This situation may occur if the blacklist was received from a source who reported IP addresses with an alerting mechanism different from any other alerting systems.

Another type of data source is internal blacklists. In some embodiments, the IP reputation system 150 may use all the IP addresses that appear in the internal blacklists and apply similar weighting methods as previously discussed regarding external blacklists to IP addresses originating from the internal blacklists. In some other embodiments, higher weights may be given to the internal blacklists because they can be considered to be more trustworthy.

The process 500 then proceeds to block 530 wherein the IP reputation system 150 calculates threat reputation scores for respective IP addresses. In some embodiments, the threat reputation score for an IP address may be calculated based on a probability of a given IP address being involved in an actual threat based on the historical accuracy of threat data sources that the IP address appears in. For example, each data source is associated with a weight, which can be an estimated percentage of its IP addresses that were actually involved in a threat. If an IP addresses is reported by multiple data sources, the probabilities may be combined to produce a final score.

Figure 6:
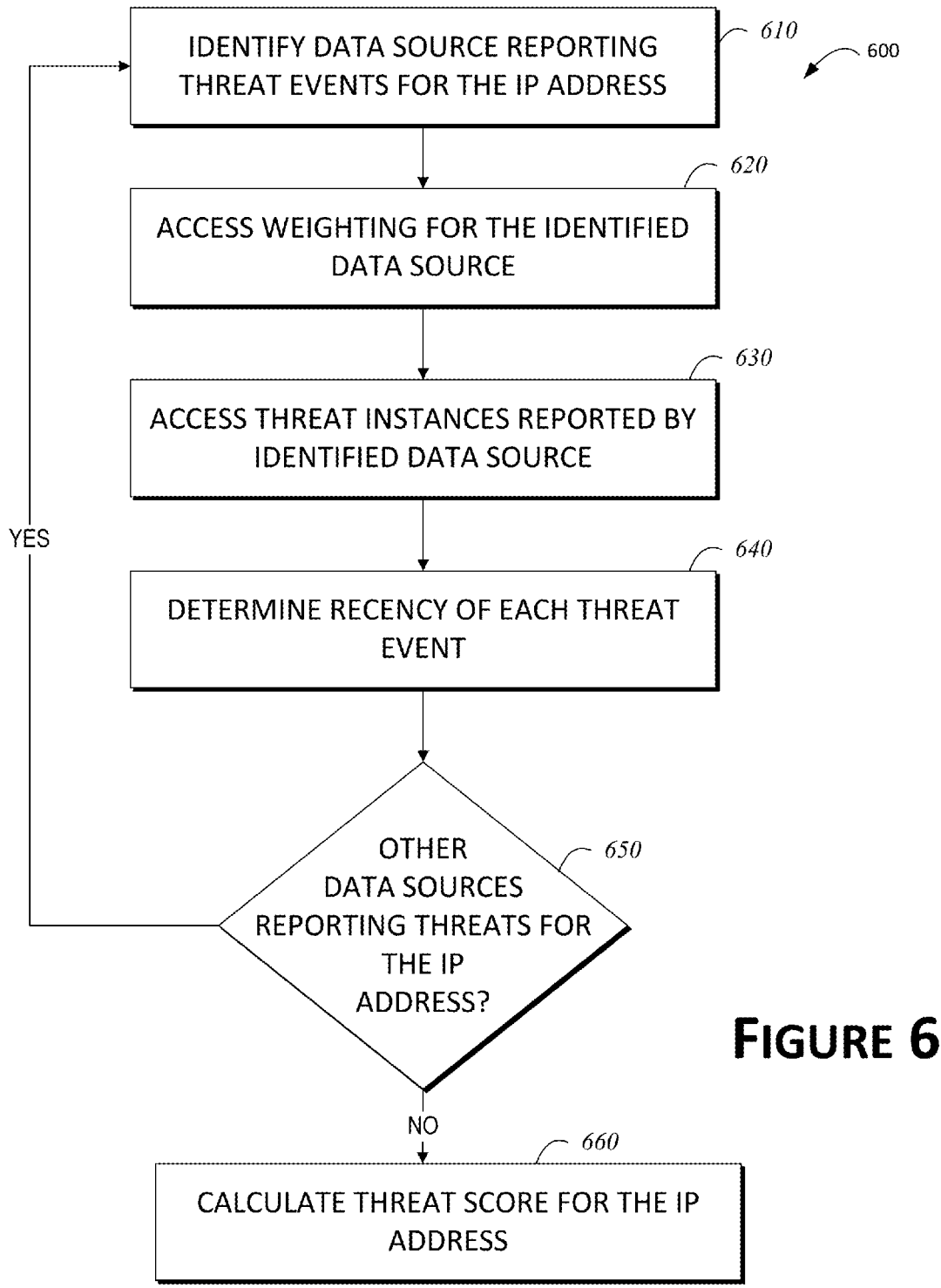
FIG. 6 is a flowchart depicting an illustrative process of calculating a threat reputation score for an IP address.

FIG. 6 is a flowchart depicting an illustrative process of calculating a threat reputation score for an IP address, such as at block 530 of FIG. 5. The process of FIG. 6 may be performed by the IP reputation system 150 in response to an inquiry regarding the potential threats related to an IP address. For example, an entity may transmit a request for a threat reputation score of an IP address that is requesting access to the entity's network, such as to gauge whether or not the IP address should be blocked from the network. In some embodiments, an entity may transmit a request for generating threat reputation scores for a plurality of IP addresses that may have attempted to or have accessed its network. The request may be processed by the IP reputation system 150 in batch.

The data sources used in the process 600 may include various sources such as a log from a VPN, an intrusion detection system, a computing device, a network device, a server, and so forth. However, the process may also be performed by other computing systems in some embodiments. Depending on the embodiment, the method of FIG. 6 may include fewer or additional blocks and the blocks may be performed in an order that is different than illustrated.

The process 600 includes several blocks that are performed for each of one or more data sources reporting and threat risk for a given IP address. In particular, blocks 610-640 may be performed for each data source.

Beginning at block 610, a data source reporting one or more risks of threat associated with the IP address is identified. The data sources may be one of an alert system, external blacklist, internal blacklist, sever log, device log, and so forth. The data sources that include risk data for the IP address may be used to calculate a weight for one or more of the data sources, such as is discussed above with reference to FIG. 5.

The process 600 then proceeds to block 620, wherein the IP reputation system 150 accesses a weighting for the identified data source. In some embodiments, this can be performed through a query to the data store 160. In one embodiment, the weighting for the data source may be calculated in real-time when needed (e.g., at block 620 of FIG. 6).

The process 600 then proceeds to block 630, wherein the IP reputation system 150 accesses threat risk instances reported by the identified data source regarding the particular IP address. For example, it may be determined that an intrusion detection system reports that the IP address 110.110.110.110 appears on its list 500 times.

The process 600 then proceeds to block 640, wherein the IP reputation system 150 determines recency of each threat event. For example, for each of the 500 times that the IP address 110.110.110.110 appears in the intrusion detection system's report, a timestamp may be associated with each occurrence. The IP reputation system may calculate the difference between the current time and the time as indicated in the timestamp. Various units, such as minutes, seconds, hours, days, months, and so forth, may be used to report the difference based on the user's needs.

The process 600 then proceeds to decision block 650, wherein the IP reputation system 150 determines whether there are other data sources reporting threat risks associated with the particular IP address being considered. If the answer to the question is yes, then the process 600 proceeds repeats blocks 610-640 for each additional data source reporting threat risks for this IP address.

If the answer at decision block 650 is no, then the process 600 proceeds to block 660, wherein the IP reputation system 150 calculates a threat score for the IP address. Risk scores may be calculated in many ways using many algorithms and inputs. One example scoring method/algorithm is discussed below. In this simplified example, the IP threat reputation system 150 receives input from data sources B1 and B2. Historically, 20% of the IP addresses that each of data sources B1 and B2 predicted as future threats were actually involved in actual past threat events. Knowing this, the IP reputation system 150 may assign a weight of 0.2 to each data source, meaning there is a 20% chance that an individual IP address on either of these lists will be involved in an actual threat event. For a new IP address being investigated that appears in both B1 and B2, there is a (1−0.2)×(1−0.2)=0.64 chance the IP address will not be a real threat. Accordingly, there is a 36% chance the IP would be a real threat. In one embodiment, the IP threat reputation score may be 36%, 0.36, or some other variant of this combined probability.

Other factors such as passage of time since the occurrence of an event may be considered in generating the threat reputation score for an IP address. In some embodiments, a decay function can be used to account for passage of time. In some embodiments, a decay factor between 0 and 1 can be assigned. If the event is less recent (for example, 2 years ago), it is considered less relevant than an event that is more recent. An example decay function can be a weighted exponential decay function. In some embodiments, the following exponential decay function may be used by the IP reputation system 150: $D_i(t):=e^{C(t-t_0)}$, wherein i is an indicator of a particular data source (e.g., i may vary from 1-500), $c_i$ is a weighting for a data source, t is the time associated with a threat event, $t_0$ is the current time, and C is a constant to limit the rate of decay. However, in other situations, other decay functions can also be used, such as a constant decay, step decay, linear decay, weibull decay, hill decay, smooth-compact decay function, and so forth.

In some embodiments, a threat reputation score may be calculated by the IP reputation system 150 as: $S_n:=1-\Pi_{i=1}^{n}(1-c_i D_i(t_i))$, wherein $S_n$ may represent the threat reputation score for an IP address considering all n occurrences of that IP address across the data sources considered by the IP reputation system 150, $c_i$ is the weight associated with each respective data source containing the ith occurrence of this IP address, $t_i$ is the time of the ith occurrence of the IP address—for example, the timestamp of an intrusion detection alert containing the IP address or the time a blacklist containing the IP address was incorporated in the IP reputation system, and $D_i(t)$ is the decay function for the data source, as discussed previously, to account for the passage of time for the ith occurrence containing this IP address.

In some other embodiments, the threat reputation score of an IP address may also be generated using a formula that is different from the one discussed above. For example, instead of exponential decay, the decay function may be configured as a constant decay (1), step decay (1 for t<L, otherwise 0), linear decay (1−t/L), weibull decay $$\left(e^{\left(-\left(\frac{t}{L}\right)^k \times \log(2)\right)}\right),$$

hill decay $$\left(\frac{1}{\left(1+\left(\frac{t}{L}\right)^{\wedge}k\right)}\right),$$

smooth-compact decay function $$\left(e^{\left(k-\frac{k}{(1-(\frac{t}{L})^{\wedge}2)}\right)}\right),$$

and so forth, wherein L is a rate of decay and k is a shape parameter. The constant value in each decay function may also be configured to differently depending on specific use cases.

Scoring methods that combine occurrences of IP addresses across many threat related data sources into a single weighted score may provide more valuable scores than a single source score. The above-noted approach gives each data source an independent, configurable weight suitable to the particular IP threat detection needs of a particular user or administrator. Additionally, multiple occurrences of an IP address in the same data source may also be considered, such that the more frequent an IP address appears, it is more likely that the threat reputation score is higher. Moreover, using this approach, older events in an IP address's history may contribute less than more recent events to the overall threat reputation score of an IP address.

Example Usage Scoring Methods

Figure 7:
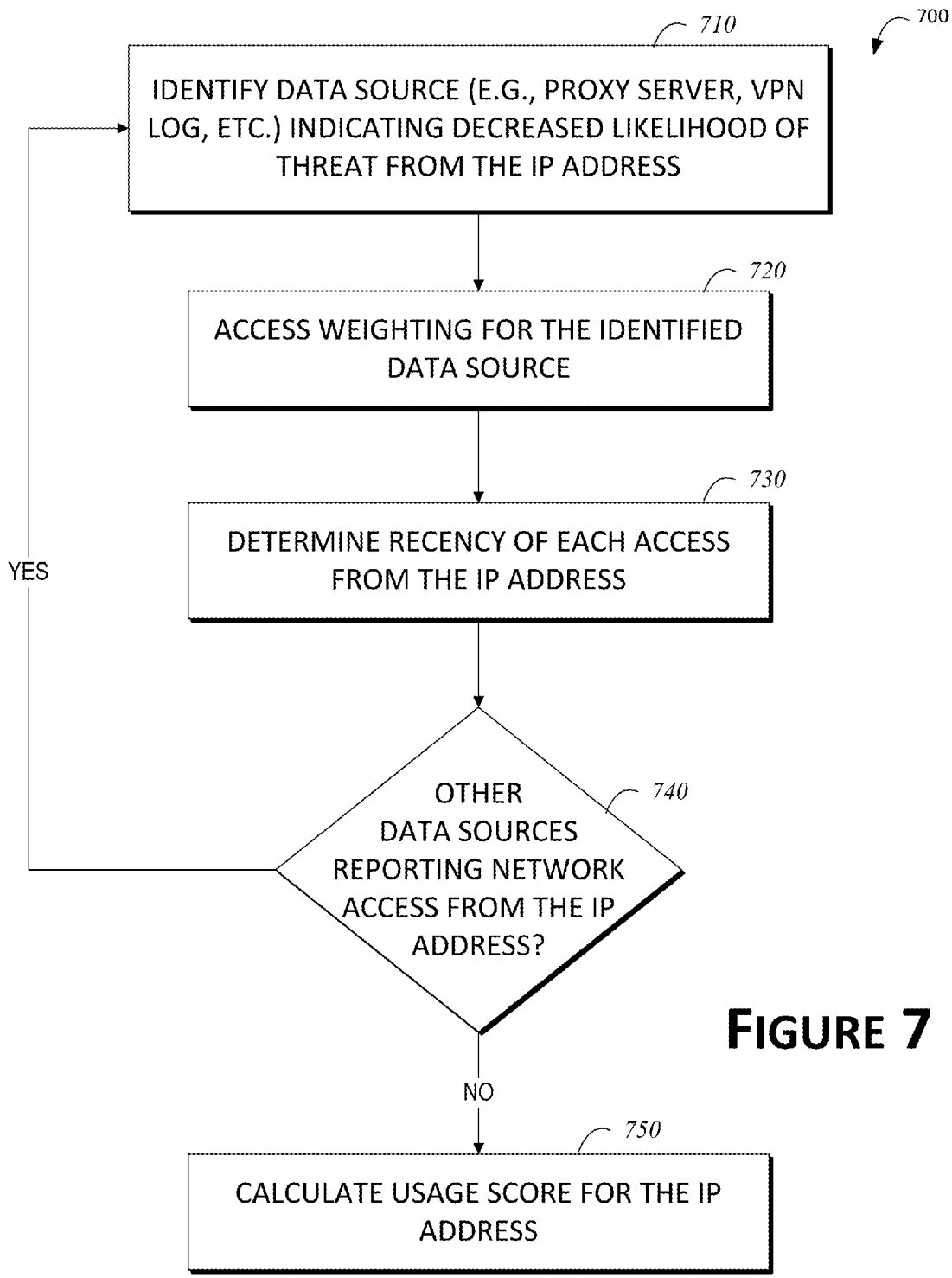
FIG. 7 is a flowchart depicting an illustrative process of calculating a usage score for an IP address.

FIG. 7 is a flowchart depicting an illustrative process of calculating a usage score for an IP address. A usage score provides an indication of a level of activities that are indicative of non-threatening activities associated with an IP address. For example, if an IP address appears in VPN logs, white lists, or weblogs hitting a post-login URL, it could be used by an employee, customer, or other trusted user. In addition, if proxy server data shows that many employees are regularly connecting to an IP address that appears on a black list, it may be a sign that it is a false positive (e.g., perhaps the IP address should not be on the blacklist). Therefore, generating a separate and independent score may be useful in determining an overall reputation for IP addresses.

The process of FIG. 7 may be performed by the IP reputation system 150 in response to input from one or more data sources, for example, such as a log from a VPN, an intrusion detection system, a computing device, a network device, a server, and so forth. However, the process may also be performed by other computing systems in some embodiments. Depending on the embodiment, the method of FIG. 7 may include fewer or additional blocks and the blocks may be performed in an order that is different than illustrated. FIG. 7 includes several blocks that are performed for each of one or more data sources reporting information that is indicative of reduced risk of an actual threat for a given IP address. In particular, blocks 710-740 may be performed for each data source.

The process 700 begins at block 710, wherein a data source reporting decreased likelihood of a threat associated with a particular IP address (or range of IP addresses in some embodiments) is identified. The data source may report network usage events, such as an authorized user logging on to a VPN network, a bank customer logging into his or her banking account, a customer of a business logging into a payment system, an authorized user establishing a connection to a proxy server, and so forth. The data sources may be one of a trusted device list, a VPN log, a secure FTP server log, an authorized user data store, and so on. In addition to receiving reports of network usage events, the process 700 may also use the received reports from the data source to calculate a weight for this data source (e.g., block 720), which may be used to represent how trustworthy the sources are, as discussed previously.

The process 700 then proceeds to block 720, and weighting for the identified data source is accessed. In some embodiments, this can be performed through a query to the data store 160. In some other embodiments, the weights may be accessed directly by the IP reputation system 150 as previously calculated weight data that has already been made available to the system. In one embodiment, the weighting for the data source may be calculated in real-time when needed (e.g., at block 720 of FIG. 7).

The process 700 then proceeds to block 730, and the recency of each network usage event in data from the identified data source is determined. For example, for each of the 500 times that the IP address 110.110.110.110 appears in a VPN log, a timestamp may be associated with each occurrence. The IP reputation system may calculate the difference between the current time and the time as indicated in the timestamp. Various units, such as minutes, seconds, hours, days, months, and so forth, may be used to report the difference based on the user's needs.

The process 700 then proceeds to decision block 740 wherein the IP reputation system 150 determines whether there are still other data sources reporting decreased risks associated with the particular IP address being considered. If the answer to the question in decision block 740 is no, then the process 600 proceeds to block 660 and calculates a usage score for the IP address. If there are additional sources, blocks 710-730 are repeated for each additional data source before proceeding to block 750.

Depending on the embodiment, the usage score can be determined by the sum of all customer, employee, or other trusted usage events whose contributions to the usage score are decayed over time. In some embodiments, a similar decay rate as previously discussed for the threat reputation scores may be used. A different decay rate function may also be configured as needed. In some embodiments, the usage score can be calculated as $S_{usage} := \sum_{i=1}^{n} k_i e^{c_i(t_i - t_0)}$, where $t_i$ is the time of the event, $t_0$ is the current time, $C_i$ is a constant used to limit the rate of decay for the data source containing the ith event, $k_i$ is an optional constant to weight occurrences in some data sources higher than others.

In some embodiments, $k_i$ may be determined based on how reliable a certain data source is. For example, if an IP address appears in the list of internal bank IP addresses, this may indicate that this IP address is more trustworthy than those IP addresses that appear in customer web sessions. Alternatively, in some other embodiments, the value of $k_i$ may be determined using an approach that is similar to the determination of the weight $c_i$ for the data source containing the ith occurrence of the IP address as discussed in FIG. 5. A weight $c_i$ for a data source can be calculated based on the percentage of IP addresses that are actually used by authorized users, trusted employees/customers, etc., as compared to the total reported IP addresses as being used by such users.

In some embodiments, in addition to the usage score calculated as above, the usage score is further normalized to constrain the score to a value between 0 and 1. Depending on the embodiment, such normalization may be achieved through a function such as:

$$\hat{S} := \left(\frac{2}{\pi}\right) \arctan(kS_{usage}),$$

where $\hat{S}$ represents a normalized usage score, $S_{usage}$ is the usage score before normalization, and k is the constant to control how quickly $\hat{S}$ approaches 1. The constant k may be configured and changed by a user or an administrator based on need.

In some embodiments, calculating a separate usage score for an IP address may be favorable over combining it with the threat reputation score. If the usage score is a separate non-zero score, it may indicate immediately to a user or administrator that an investigation may be necessary to see whether an IP address is being used in a non-malicious way before potentially black listing the IP address based on a high threat reputation score. On the other hand, it may also indicate to the administrator to see whether the account of a trusted user or employee has been hacked or rendered as a dummy for attacks.

Moreover, calculating a separate usage score allows the threat reputation score to separately indicate risks associated with an IP address, without diluting with positive customer and employee activity. Finally, calculating a separate usage score may make it easier to answer a question such as "What percentage of blacklisted IP addresses are our customers' and employees' IP addresses?" This may be achieved by generating the usage score for each blacklisted IP address and see if any of the usage scores are non-zero or significantly above zero.

Example Heat Map Interface

Figure 8:
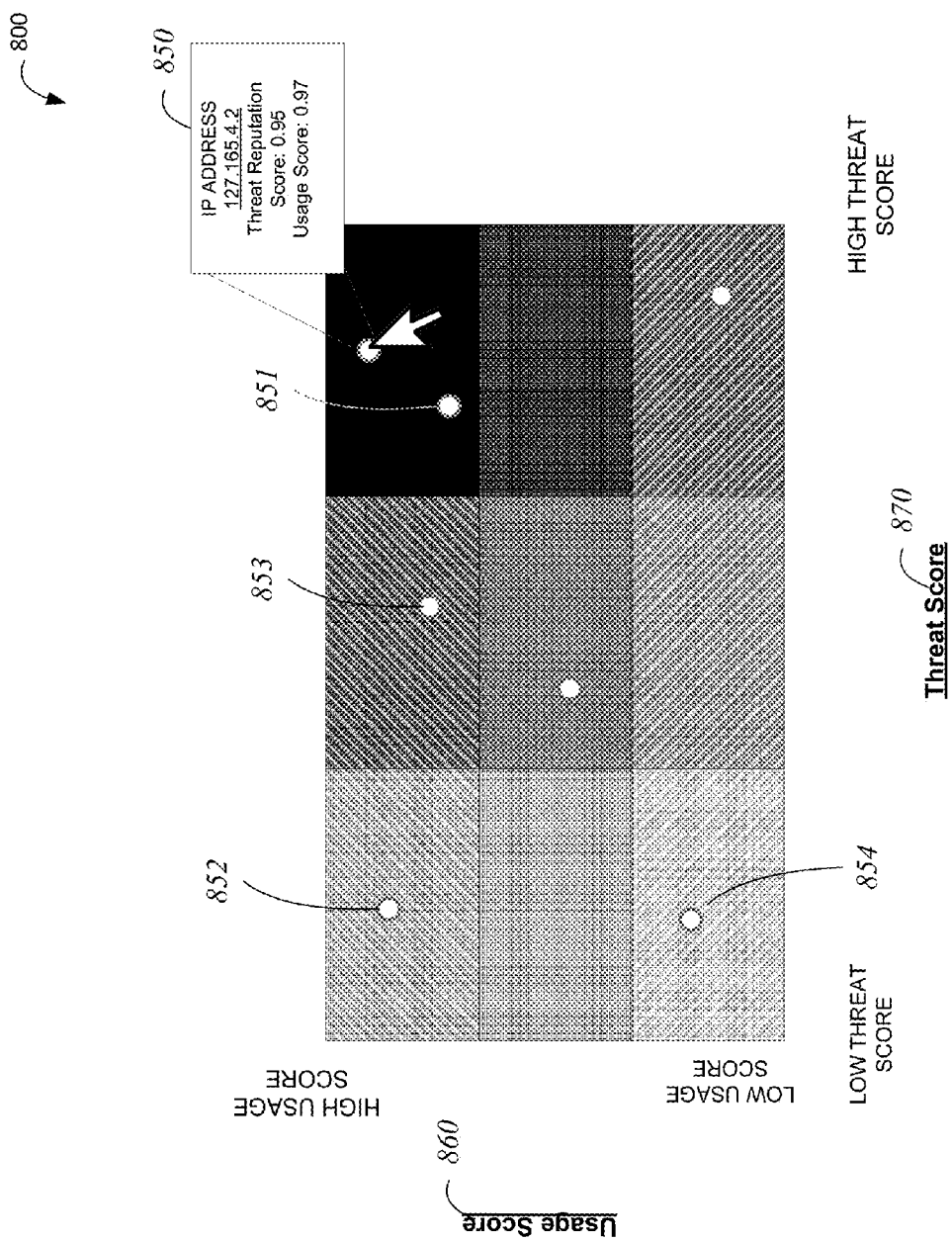
FIG. 8 is a two-dimensional heat map illustrating threat reputation scores and usage scores of IP addresses.

FIG. 8 is a two-dimensional example heat map illustrating several IP addresses within a threat reputation scores and usage scores matrix. The heat map 800 includes two dimensions, the horizontal dimension representing threat score 870 and the vertical dimension representing usage score 860. The heat map may display the scores associated with a plurality of IP addresses.

Depending on the embodiment, each IP address may be represented by the reporting module 158 in the heat map 800 using its threat reputation score and usage score. As can be seen from the heat map 800, an IP address 851 with a high threat reputation score appears on the right part of the heat map 800. An IP address 852 with a low threat reputation score appears on the left part of the heat map 800. An IP address 853 associated with a high usage score usually appears on the upper part of the heat map 800, and an IP address 854 associated with a low usage score usually appears on the lower part of the heat map 800. Plotting the scores associated with a plurality of IP addresses can also demonstrate whether the scores of a particular IP address are high or low as compared to other scores and allows a user to identify areas of potential interest. For example, in one embodiment a user may be primarily interested in IP addresses associated with a high risk score and a low usage score. Accordingly, the user may look towards the lower right-hand quadrant of the heat map in order to identify IP addresses that fall within this category. Additionally, the user may easily identify clusters of IP addresses within (or across) a particular quadrant. Such clustering may be indicative of behavior that the user desires to investigate.

In some embodiments, the heat map may be resolved into specific IP addresses. For example, an IP address and its associated scores may be displayed in pop-up window 850 when a mouse hovers on top of that point in the heat map. The IP address displayed is 127.165.4.2, and it has a threat reputation score of 0.95 and usage score of 0.97. Depending on the specific instance, the scores may mean that this is a false positive because the IP address is very trustworthy and it should not have a high threat reputation score. However, the scores could also mean that a hacker is posing as a trusted user and has been involved in actual threat events. Either way, the heat map 800 may be used for recognizing noteworthy IP addresses for further analysis and also for displaying trends of possible network threats. Although a pop-up window is shown in this example, other types of user interface elements may also be used to demonstrate details regarding the scores associated with an IP address to a user.

Implementation Mechanisms

According to one embodiment, the techniques described herein are implemented by one or more special-purpose computing devices, such as the IP reputation system 150. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 9:
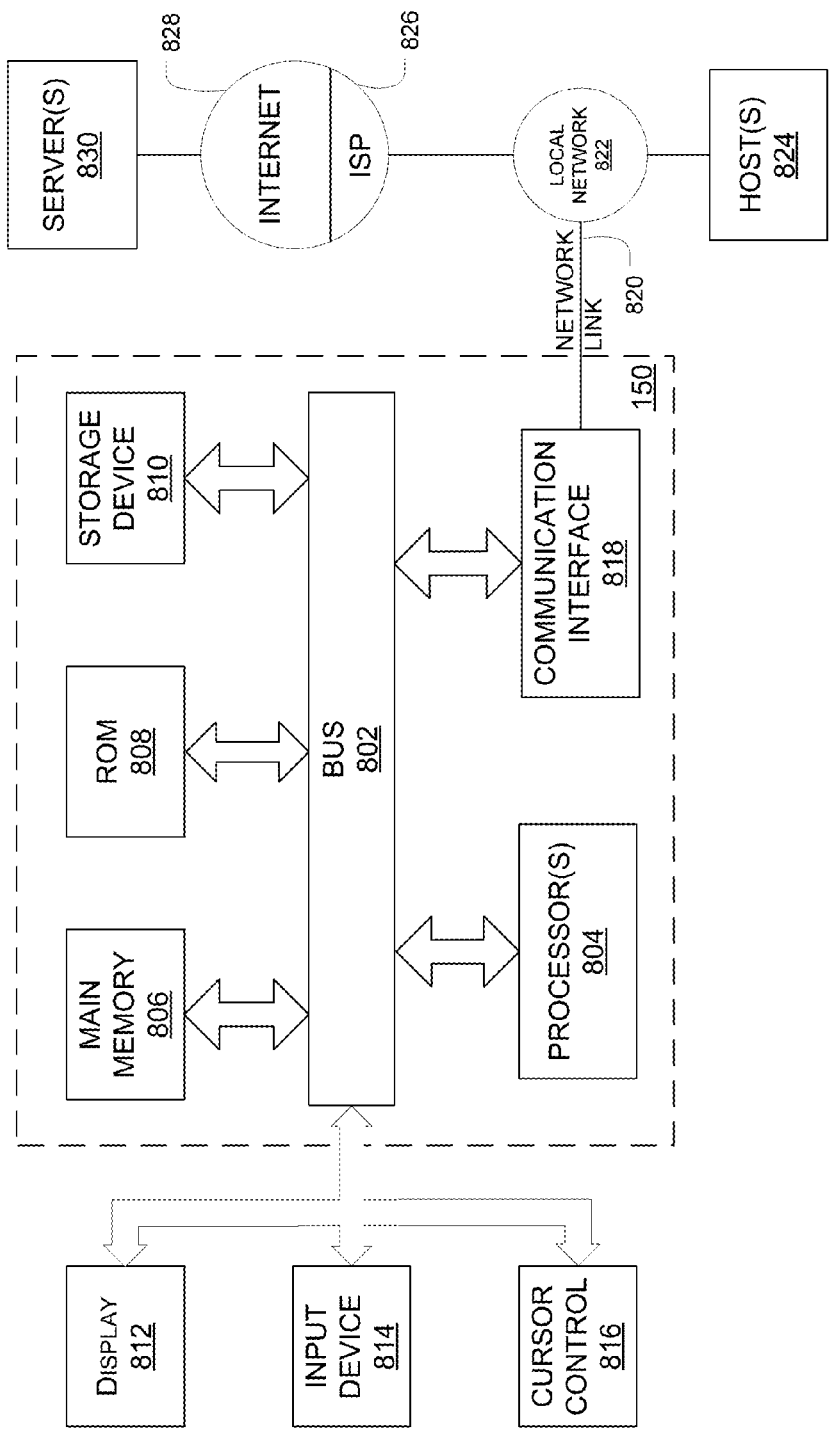
FIG. 9 is a block diagram illustrating one embodiment of a computer system with which certain methods and modules discussed herein may be implemented.

For example, FIG. 9 is a block diagram that illustrates a computer system (such as the IP reputation system 150) upon which the processes discussed herein may be implemented. For example, the risk assessment 340 and the heat map interface 800 may be generated and displayed to a user by an IP reputation system 150, while a search query may be executed by another IP reputation system 150 (or possibly the same computer system in some embodiments). Further-more the data sources may each include any portion of the components and functionality discussed with reference to the IP reputation system 150.

The IP reputation system 150 includes a bus 802 or other communication mechanism for communicating information, and a hardware processor, or multiple processors, 804 coupled with bus 802 for processing information. Hardware processor(s) 804 may be, for example, one or more general purpose microprocessors.

The IP reputation system 150 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render IP reputation system 150 into a special-purpose machine that is customized to perform the operations specified in the instructions.

The IP reputation system 150 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The IP reputation system 150 may be coupled via bus 802 to a display 812, such as a cathode ray tube (CRT) or LCD display (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The IP reputation system 150 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage IP reputation system 150 may implement the techniques described herein using customized hard-wired logic, one or more ASICs or FPGAs, firmware and/or program logic which in combination with the computer system causes or programs the IP reputation system 150 to be a special-purpose machine. According to one embodiment, the techniques herein are performed by the IP reputation system 150 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to IP reputation system 150 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may retrieves and executes the instructions. The instructions received by main memory 806 may optionally be stored on storage device 810 either before or after execution by processor 804.

IP reputation system 150 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from the IP reputation system 150, are example forms of transmission media.

The IP reputation system 150 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A system for detecting computer network threats, the system comprising one or more computer hardware processors that execute specific code instructions to cause the system to at least:
    receive a network address of a computing system connected to a network attempting or requesting to access a first server connected to the network;
    determine a threat indicator for the network address, wherein the threat indicator indicates a risk level associated with the network address, and wherein the threat indicator is based at least in part on:

a recency of historical activity associated with the network address, wherein the recency is determined by the system based at least in part on:
   a time associated with an activity of the network address, wherein the time is determined by the system based on at least one of the following:
      an amount of time between an occurrence of the network address and a current time, or
      an amount of time between a first occurrence of the network address and a second occurrence of the network address; and
   a determination regarding reliability of a data source providing some or all of the historical activity data, wherein the reliability of the data source indicates a history of the data source in previously identifying a perceived threat; and
in response to determining the threat indicator, initiate an action based at least in part on the threat indicator to perform one or more of: blocking the network address, allowing the network address, or modifying a network address list.

2. The system of claim 1, wherein the threat indicator for the network address is further based on a quantity of occurrences of the network address in the activity of the network address.

3. The system of claim 1, wherein the reliability of the data source indicates a history of the data source in previously identifying a perceived threat that later was confirmed to be an actual threat.

4. The system of claim 1, wherein the threat indicator for the network address is further based on a quantity of occurrences of network addresses associated with the network address in the activity of the network address.

5. The system of claim 1, wherein the threat indicator for the network address comprises a threat score.

6. The system of claim 5, wherein determining the threat indicator for the network address further comprises increasing the threat score in response to increases in a quantity of occurrences of the network address in the activity of the network address and wherein the increased threat score indicates a higher risk level associated with the network address.

7. The system of claim 3, wherein the one or more computer hardware processors is further programmed, via executable code instructions, to receive the network address from a second data source, wherein receiving the network address from the second data source indicates that the network address was likely involved in a network attack; and
in response to receiving the network address from the computing system connected to the network and the second data source, increasing the likelihood that the perceived threat of the network address is an actual threat.

8. A computer-implemented method comprising:
receiving, at a computing device, a network address of a computing system connected to a network attempting or requesting to access a first server connected to the network;
determining a threat indicator for the network address, wherein the threat indicator indicates a risk level associated with the network address, and wherein the threat indicator is based at least in part on:
   a recency of activity of the network address based on historic activity associated with the network address, wherein the recency is determined by the system based at least in part on:
      a time associated with an activity of the network address, wherein the time is determined by the system based on at least one of the following:
         an amount of time between an occurrence of the network address and a current time, or
         an amount of time between a first occurrence of the network address and a second occurrence of the network address; and
      a determination regarding reliability of a data source providing some or all of the historical activity data, wherein the reliability of the data source indicates a history of the data source in previously identifying a perceived threat; and
   in response to determining the threat indicator, initiate an action based at least in part on the threat indicator to perform one or more of: blocking the network address, allowing the network address, or modifying a network address list.

9. The computer-implemented method of claim 8, wherein the threat indicator is further based at least in part on a quantity of occurrences of the network address in the historic activity.

10. The computer-implemented method of claim 8, wherein the threat indicator is further based at least in part on a likelihood that the network address is trustworthy, wherein the likelihood is based at least in part on records of trustworthy activity in the historical activity.

11. The computer-implemented method of claim 8, wherein the historic activity is determined through records associated with at least one of: a Virtual Private Network, a firewall, or a proxy server.

12. The computer-implemented method of claim 8, further comprising:
identifying a network address match that at least partially matches the network address in at least one of: a trusted user list, a whitelist, employee data, or a Virtual Private Network list; and
in response to identifying the network address match, decreasing the threat indicator.

13. The computer-implemented method of claim 12, wherein the network address match is determined based at least in part on the network address's presence in at least one of the: a trusted user list, a whitelist, employee data, or a Virtual Private Network list.

14. The computer-implemented method of claim 8, further comprising:
causing presentation of the threat indicator and the network address in a user interface.

15. The computer-implemented method of claim 8, wherein the threat indicator comprises a threat score.

16. The computer-implemented method of claim 8, wherein determining the threat indicator for the network address further comprises assigning a weight to a threat score based at least in part on the reliability of the data source.

17. A non-transitory computer-readable storage medium storing computer-executable instructions that, when executed by one or more processors, cause the processors to:
receive a network address of a computing system connected to a network attempting or requesting to access a first server connected to the network;
determine a threat indicator for the network address, wherein the threat indicator indicates a risk level associated with the network address, and wherein the threat indicator is based at least in part on:

a recency of activity of the network address based on historic activity associated with the network address, wherein the recency is determined by the system based at least in part on:
  a time associated with an activity of the network address, wherein the time is determined by the system based on at least one of the following:
    an amount of time between an occurrence of the network address and a current time, or
    an amount of time between a first occurrence of the network address and a second occurrence of the network address; and
  a determination regarding reliability of a data source providing some or all of the historical activity data, wherein the reliability of the data source indicates a history of the data source in previously identifying a perceived threat; and
in response to determining the threat indicator, initiate an action based at least in part on the determined threat indicator to perform one or more of: blocking the network address, allowing the network address, or modifying a network address list.

18. The non-transitory computer-readable storage medium of claim 17, wherein the threat indicator is further based at least in part on a quantity of occurrences of the network address in the activity of the network address.

19. The non-transitory computer-readable storage medium of claim 17, wherein the threat indicator is further based at least in part on a likelihood that the network address is trustworthy, wherein the likelihood is based at least in part on historical data of activities associated with the activity of the network address.

* * * * *